US008112458B1

(12) United States Patent
Kumar et al.

(10) Patent No.: US 8,112,458 B1
(45) Date of Patent: Feb. 7, 2012

(54) USER SEGMENTATION USER INTERFACE

(75) Inventors: Prasana Kumar, Bellevue, WA (US); Umachandar Jayachandaran, Bellevue, WA (US); Roman Basko, Newcastle, WA (US); Jason Carlisle, Seattle, WA (US); Radha Krishna Uppala, Bellevue, WA (US)

(73) Assignee: AudienceScience Inc., Bellevue, WA (US)

( * ) Notice: Subject to any disclaimer, the term of this patent is extended or adjusted under 35 U.S.C. 154(b) by 168 days.

(21) Appl. No.: 12/408,660

(22) Filed: Mar. 20, 2009

Related U.S. Application Data

(63) Continuation of application No. 10/870,688, filed on Jun. 17, 2004, now abandoned.

(60) Provisional application No. 60/479,353, filed on Jun. 17, 2003.

(51) Int. Cl.
G06F 7/00 (2006.01)
G06F 17/30 (2006.01)
G06F 3/048 (2006.01)
G06Q 10/00 (2006.01)

(52) U.S. Cl. ........ 707/805; 707/752; 707/802; 715/853; 715/854; 705/7.33

(58) Field of Classification Search .................. None
See application file for complete search history.

(56) References Cited

U.S. PATENT DOCUMENTS

| | | | |
|---|---|---|---|
| 5,530,939 A | 6/1996 | Mansfield, Jr et al. | |
| 5,721,831 A * | 2/1998 | Waits et al. ................ | 705/36 R |
| 5,742,806 A | 4/1998 | Reiner et al. | |
| 5,870,746 A | 2/1999 | Knutson et al. | |
| 6,003,036 A | 12/1999 | Martin | |
| 6,061,658 A | 5/2000 | Chou et al. | |
| 6,078,891 A | 6/2000 | Riordan et al. | |
| 6,112,186 A | 8/2000 | Bergh et al. | |
| 6,272,472 B1 | 8/2001 | Danneels et al. | |
| 6,374,263 B1 | 4/2002 | Bunger et al. | |
| 6,377,993 B1 | 4/2002 | Brandt et al. | |
| 6,430,539 B1 | 8/2002 | Lazarus et al. | |
| 6,609,131 B1 | 8/2003 | Zait et al. | |
| 6,615,258 B1 | 9/2003 | Barry et al. | |
| 6,629,102 B1 | 9/2003 | Malloy et al. | |
| 6,694,322 B2 | 2/2004 | Warren et al. | |
| 6,785,666 B1 | 8/2004 | Nareddy et al. | |
| 6,839,682 B1 | 1/2005 | Blume et al. | |
| 6,873,981 B2 | 3/2005 | Nareddy et al. | |
| 6,892,347 B1 | 5/2005 | Williams et al. | |
| 6,917,972 B1 | 7/2005 | Basko et al. | |
| 6,993,529 B1 | 1/2006 | Basko et al. | |
| 7,003,476 B1 | 2/2006 | Samra et al. | |

(Continued)

OTHER PUBLICATIONS

Maurer, W.D. and Lewis, T.G. 1975. Hash Table Methods. ACM Comput. Surv. 7, 1 (Mar. 1975), 5-19. DOI = http://doi.acm.org/10.1145/356645.

(Continued)

Primary Examiner — Matthew Sked
(74) Attorney, Agent, or Firm — Perkins Coie LLP

(57) ABSTRACT

A facility for defining a distinguished segment of individuals within a population of individuals is described. The facility displays a prompt for user input specifying a natural-language characterization of a segment membership criterion for identifying individuals who are members of the distinguished segment. The facility then receives, in response to the displayed prompt, user input specifying a natural-language characterization of a segment membership criterion for identifying individuals who are members of the distinguished segment.

6 Claims, 23 Drawing Sheets

U.S. PATENT DOCUMENTS

| | | | |
|---|---|---|---|
| 7,035,925 | B1 | 4/2006 | Nareddy et al. |
| 7,107,338 | B1 | 9/2006 | Nareddy et al. |
| 7,117,193 | B1 | 10/2006 | Basko et al. |
| 7,120,666 | B2 | 10/2006 | McCanne et al. |
| 7,165,037 | B2 | 1/2007 | Lazarus et al. |
| 7,188,334 | B1 | 3/2007 | Sinclair |
| 7,197,517 | B2 * | 3/2007 | Farrington et al. ........... 707/797 |
| 7,231,612 | B1 | 6/2007 | Mani et al. |
| 7,370,342 | B2 | 5/2008 | Ismail et al. |
| 7,464,122 | B1 | 12/2008 | Basko et al. |
| 7,493,312 | B2 | 2/2009 | Liu et al. |
| 7,676,467 | B1 | 3/2010 | Kozyrczak et al. |
| 2002/0082901 | A1 | 6/2002 | Dunning et al. |
| 2002/0095421 | A1 | 7/2002 | Koskas |
| 2002/0099691 | A1 | 7/2002 | Lore et al. |
| 2003/0014304 | A1 | 1/2003 | Calvert et al. |
| 2003/0028509 | A1 | 2/2003 | Sah et al. |
| 2003/0074348 | A1 | 4/2003 | Sinclair et al. |
| 2003/0101451 | A1 | 5/2003 | Bentolila et al. |
| 2003/0163438 | A1 | 8/2003 | Barnett et al. |
| 2003/0204447 | A1 | 10/2003 | Dalzell et al. |
| 2003/0216966 | A1 | 11/2003 | Saenz et al. |
| 2004/0088376 | A1 | 5/2004 | McCanne et al. |
| 2004/0116783 | A1 | 6/2004 | Weaver |
| 2004/0172400 | A1 | 9/2004 | Zarom et al. |
| 2004/0181554 | A1 | 9/2004 | Heckerman et al. |
| 2004/0230947 | A1 | 11/2004 | Bales et al. |
| 2005/0015571 | A1 | 1/2005 | Kaufman et al. |
| 2005/0033771 | A1 | 2/2005 | Schmitter et al. |
| 2005/0086243 | A1 | 4/2005 | Abbott et al. |
| 2005/0159996 | A1 | 7/2005 | Lazarus et al. |
| 2005/0203888 | A1 | 9/2005 | Woosley et al. |
| 2005/0240468 | A1 | 10/2005 | Inman et al. |
| 2006/0041548 | A1 | 2/2006 | Parsons et al. |
| 2006/0069719 | A1 | 3/2006 | McCanne et al. |
| 2006/0112222 | A1 | 5/2006 | Barrall |
| 2006/0143684 | A1 | 6/2006 | Morris |
| 2006/0155605 | A1 | 7/2006 | Haighton et al. |
| 2006/0190333 | A1 | 8/2006 | Choi |
| 2006/0235764 | A1 | 10/2006 | Bamborough et al. |
| 2006/0277585 | A1 | 12/2006 | Error et al. |
| 2008/0097822 | A1 | 4/2008 | Schigel et al. |
| 2008/0189232 | A1 | 8/2008 | Dunning et al. |

OTHER PUBLICATIONS

U.S. Appl. No. 09/613,403, filed Jul. 11, 2000.
U.S. Appl. No. 10/870,688, filed Jun. 17, 2004, Kumar et al.
Non-Final Office Action; U.S. Appl. No. 10/870,688; Mailed on Sep. 22, 2008, 14 pages.
U.S. Appl. No. 09/613,403.
Maurer, W. D. et al.. "Hash Table Methods," Computing Surveys, vol. 7, No. 1, pp. 5-19, Mar. 1975.
Dainow, Brandt, "Defining Unique Visitors," iMedia Connection, 2 pages, Dec. 1, 2005.
"H", Microsoft® Computer Dictionary, Fifth Edition, 21 pages, May 2002.
Novak, T. P. et al., "New Metrics for New Media: Toward the Development of Web Measurement Standards," World Wide Web Journal, vol. 2, No. 1, pp. 213-246, 1997.
ProQuest, "My Research," 5 pages, 2008.
Sen, Shahana et al., "On the Analysis of Web Site Usage Data: How Much Can We Learn About the Consumer From Web Logfiles?," Working Paper, 28 pages, 1998.
Williamson, Debra Aho, "What Comes Before Search," The Wall Street Journal, 18 pages, Sep. 2004.
Wilson, R. Dale, "Using Web Traffic Analysis for Customer Acquisition and Retention Programs in Marketing," Services Marketing Quarterly, vol. 26, No. 2, 23 pages, 2004.

* cited by examiner

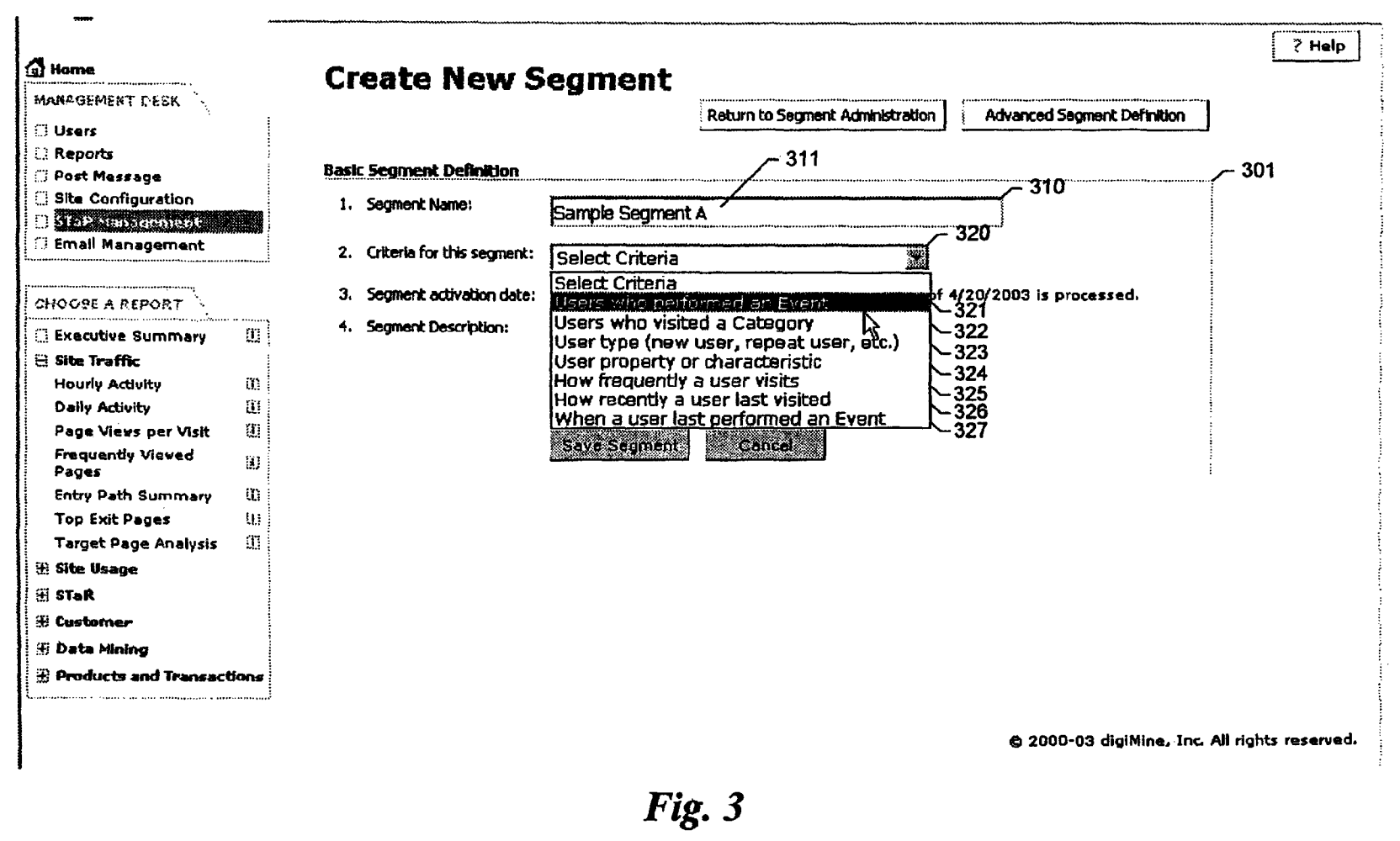

Create New Segment

Return to Segment Administration | Advanced Segment Definition

Basic Segment Definition

1. Segment Name: Sample Segment A
2. Criteria for this segment:
3. Segment activation date: [of 4/20/2003 is processed.]
4. Segment Description:

Select Criteria
- Select Criteria
- Users who performed an Event
- Users who visited a Category
- User type (new user, repeat user, etc.)
- User property or characteristic
- How frequently a user visits
- How recently a user last visited
- When a user last performed an Event Save Segment | Cancel ? Help © 2000-03 digiMine, Inc. All rights reserved.

MANAGEMENT DESK
- Home
- Users
- Reports
- Post Message
- Site Configuration
- Segment Management
- Email Management

CHOOSE A REPORT
- Executive Summary
- Site Traffic
- Hourly Activity
- Daily Activity
- Page Views per Visit
- Frequently Viewed Pages
- Entry Path Summary
- Top Exit Pages
- Target Page Analysis
- Site Usage
- STaR
- Customer
- Data Mining
- Products and Transactions

*Fig. 3*

Create New Segment

Return to Segment Administration | Advanced Segment Definition

? Help

Basic Segment Definition

1. Segment Name: Sample Segment A — 410

2. Criteria for this segment: Users who performed an Event — 420, 421

All users who [have] — 431, 434 performed [Register] — 435 in the last [1] week(s) — 432, 433, 436, 430

3. Segment activation date: This segment will become active when the week of 4/20/2003 is processed.

4. Segment Description:

[Save Segment]   [Cancel]

— 401

Home

MANAGEMENT DESK
- Users
- Reports
- Post Message
- Site Configuration
- Segment Management
- Email Management CHOOSE A REPORT
- Executive Summary
- Site Traffic
- Hourly Activity
- Daily Activity
- Page Views per Visit
- Frequently Viewed Pages
- Entry Path Summary
- Top Exit Pages
- Target Page Analysis
- Site Usage
- StaR
- Customer
- Data Mining
- Products and Transactions © 2000-03 digiMine, Inc. All rights reserved.

*Fig. 4*

Create New Segment

Return to Segment Administration | Basic Segment Definition

Advanced Segment Definition

1. Segment Name: Sample Segment A

2. Define Segment Conditions

Define Segment Condition

Criteria for condition: Users who performed an Event

All users who [have] performed [Register]

[Save Condition] — 541
   [Cancel] — 542

[ ] in the last [1] [week(s)] } 530

3. Segment activation date: This segment will become active when the week of 4/20/2003 is processed.

4. Segment Membership: Recurring Snapshot

5. Segment Description:

[Save Segment] [Cancel]

© 2000-03 digiMine, Inc. All rights reserved.

*Fig. 5*

Create New Segment

Advanced Segment Definition

Return to Segment Administration | Basic Segment Definition

1. Segment Name: Sample Segment A

2. Define Segment Conditions

Define Segment Condition

— 651  — 650

All users who have performed 'Register' in the last 1 week(s) — 652

*(the membership of this segment will be updated on a weekly basis)* — 658

Add Another Condition — 659

Save Condition | cancel

3. Segment activation date: This segment will become active when the week of 4/20/2003 is processed.

4. Segment Membership: Recurring Snapshot

5. Segment Description:

Save Segment | cancel

— 653 Edit  — 654 Delete

? Help

© 2000-03 digiMine, Inc. All rights reserved.

Home

MANAGEMENT DESK
- Users
- Reports
- Post Message
- Site Configuration
- *[Segment Management]*
- Email Management CHOOSE A REPORT
- Executive Summary
- Site Traffic
  - Hourly Activity
  - Daily Activity
  - Page Views per Visit
  - Frequently Viewed Pages
  - Entry Path Summary
  - Top Exit Pages
  - Target Page Analysis
- Site Usage
- STaR
- Customer
- Data Mining
- Products and Transactions

Fig. 9 segment definitions ← 1000

← 1010

...

1011 ⌒ number: 5
1012 ⌒ name: sample segment A
1013 ⌒ description: men who registered this week
1014 ⌒ population strategy: recurring snapshot
1015 ⌒ definition:
1016 ⌒    AND
1017 ⌒       clause 5.1
1018 ⌒          clause type 1 - Users who performed an event
1019 ⌒          have, Register, 1 week
1020 ⌒       clause 5.2
1021 ⌒          clause type 4 - User property or characteristic
1022 ⌒          Gender, equal to, M

Fig. 11 table T1, date D1 — 1100

| C1: userid | C2: event | C3: time | C4: result |
|---|---|---|---|
| 6514 | register | 00:07:32 | succeed |
| 4126 | register | 00:07:49 | succeed |
| 9713 | contact us | 00:09:11 | succeed |
| 2163 | white papers | 00:10:21 | succeed |
| 2316 | keyword search | 00:14:15 | succeed |
| 2213 | register | 00:17:00 | succeed |
| 2316 | register | 00:17:00 | succeed |
| 1035 | white papers | 00:17:03 | succeed |

1101 / 1102 / 1103 / 1104

Fig. 12 table T1, date D2 — 1200

| C1: userid | C2: event | C3: time | C4: result |
|---|---|---|---|
| 2163 | register | 00:05:11 | succeed |
| 5212 | contact us | 00:06:21 | succeed |
| 2316 | keyword search | 00:08:15 | succeed |
| 2213 | white papers | 00:08:17 | succeed |
| 1035 | white papers | 00:09:03 | succeed |

1201 / 1202 / 1203 / 1204

Fig. 13 table T2, date D1 — 1300

| C1: userid | C2: category visited | C3: time |
|---|---|---|
| 2783 | applications | 00:03:32 |
| 1123 | operating systems | 00:03:49 |
| 4614 | games | 00:04:21 |
| 2163 | utilities | 00:04:21 |
| 2316 | applications | 00:14:15 |
| 2213 | applications | 00:16:40 |
| 4519 | utilities | 00:17:00 |
| 8234 | operating systems | 00:17:03 |

1301 / 1302 / 1303

Fig. 14 table T2, date D2 — 1400

| C1: userid | C2: category visited | C3: time |
|---|---|---|
| 2213 | applications | 00:26:21 |
| 1123 | operating systems | 00:33:49 |
| 4614 | games | 00:33:51 |
| 4519 | utilities | 00:33:51 |
| 8234 | operating systems | 00:34:03 |

1401 / 1402 / 1403

Fig. 15 table T3 — 1500

| C1: userid | C2: age | C3: gender | C4: country |
|---|---|---|---|
| 2316 | 21 | M | US |
| 4126 | 34 | M | FR |
| 2163 | 62 | M | US |
| 2213 | 15 | F | UK |
| 6514 | 25 | M | JP |

1501 / 1502 / 1503 / 1504 / 1511

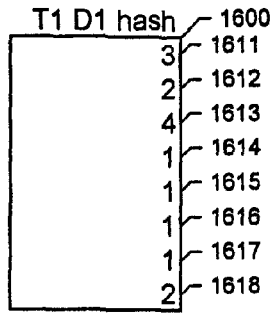
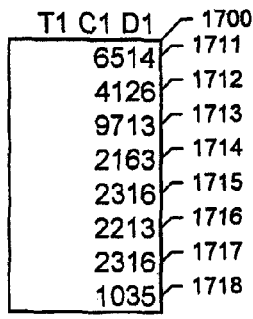
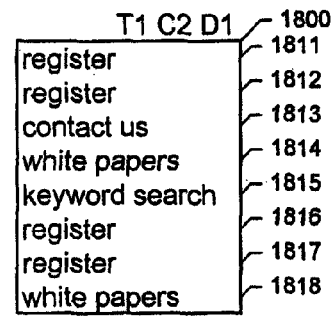
*Fig. 16*     *Fig. 17*     *Fig. 18*
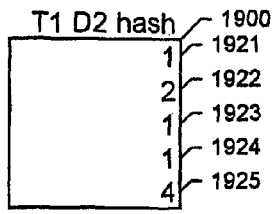
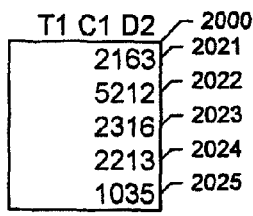
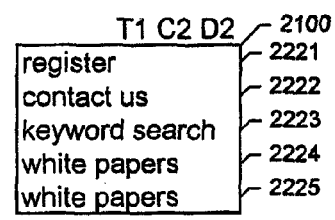
*Fig. 19*     *Fig. 20*     *Fig. 21*
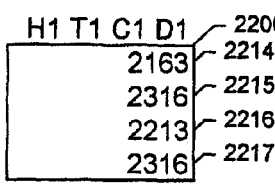
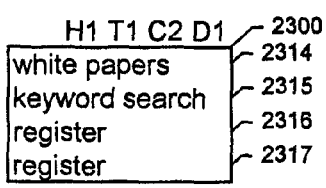
*Fig. 22*     *Fig. 23*
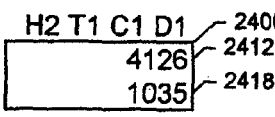
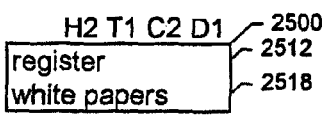
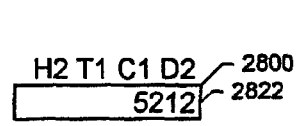
*Fig. 24*     *Fig. 25*     *Fig. 28*
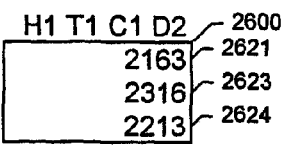
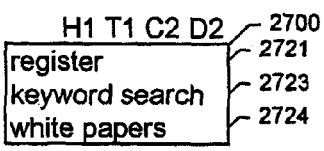
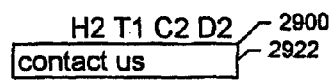
*Fig. 29*
*Fig. 26*     *Fig. 27*

Compare Multiple Segments

Please check all the segments you wish to include:

- User Types — 3910, 3911
  - ☑ All Users — 3912
  - ☐ Anonymous Users — 3913
  - ☐ New Users — 3914
  - ☐ Repeat Users

- Active Weekly Segments — 3920, 3921
  - ☑ Deep Users — 3922
  - ☐ Filed a Complaint — 3923
  - ☐ Frequent Buyers — 3924
  - ☐ Frequent Users — 3925
  - ☐ Light Browsers — 3926
  - ☐ One-time Visitors — 3927
  - ☐ Purchasers — 3928
  - ☑ Recent Buyers — 3929
  - ☐ Recent Users — 3930
  - ☐ Spent Over $1000 — 3931
  - ☐ Spent Under $30 — 3932
  - ☐ Washington State Users

[Compare] — 3941   [Cancel] — 3942

*Fig. 39*

USER SEGMENTATION USER INTERFACE

CROSS-REFERENCE TO RELATED APPLICATIONS

This patent application is a continuation of U.S. patent application Ser. No. 10/870,688 entitled "USER SEGMENTATION USER INTERFACE" filed Jun. 17, 2004, now abandoned, which claims priority to U.S. Provisional Application No. 60/479,353 entitled "USER SEGMENTATION USER INTERFACE" filed on Jun. 17, 2003 and is related to U.S. patent application Ser. No. 10/870,553 entitled "USER SEGMENT POPULATION TECHNIQUES" filed concurrently herewith, which applications are hereby incorporated by reference in their entireties.

TECHNICAL FIELD

The present invention is directed to the field of analytical techniques, and, more particularly, to the field of population segmentation techniques.

BACKGROUND

Web browsing is an increasingly common behavior. When a user browses a particular web site, the operator of that web site can collect significant volumes of information about the user's interaction with the web site. As one way of deriving value from such collected user data, a web site operator may wish to divide the users that visit its web site into groups, such that the members in each group share one or more significant characteristics or behaviors. This process of dividing users into groups is termed segmentation, and the groups are called segments. As one example, one segment of users for a sporting goods web site may be those users who visited any of the pages of a section of the web site devoted to fishing in the past 2 weeks.

User data is typically stored in a database, and can be extremely voluminous for a popular web site. The process of segmenting users based on user data is called segment population. In order to perform segment population, the operator of a web site must generally write custom code to manipulate the user data stored in the database to identify the members of each segment. This is time-consuming, requires the services of a skilled programmer, and can be quite expensive.

Also, because the set of segments to be populated and the tests used to identify the members of each segment in the set are typically embodied by the custom code, if a consumer of the segments wants to specify and populate a new segment after the original custom programming is complete, additional custom code must be written.

Further, it can be inefficient to analyze data within the database in order to perform segment population. This makes it expensive to use segments, and may limit the frequency with which segments can be repopulated, in turn limiting the currency of segment populations.

In view of the aforementioned shortcomings of conventional user segmentation techniques, a facility for automatically populating segments in an efficient way based upon plain-English segment definitions that can be prepared by users other than programmers would have significant utility.

BRIEF DESCRIPTION OF THE DRAWINGS

FIGS. 2-9 are display diagrams showing aspects of a typical user interface for creating segment definitions provided by some embodiments of the facility.

FIG. 10 is a data structure diagram showing a sample segment definition that is typical of those created and used by the facility.

FIGS. 11-15 are data structure diagrams showing sample database tables that are typical of those from which the facility extracts information for use in populating segments.

FIGS. 16-21 are data structure diagrams showing column data structures that the facility extracts from database tables for the purpose of populating segments.

FIGS. 22-29 are data structure diagrams showing data chunk data structures generated from the column data structures shown in FIGS. 16-21.

FIGS. 38-40 are display diagrams showing a sample report displayed by the facility that may be simultaneously filtered by multiple populated segments.

DETAILED DESCRIPTION

Figure 1:
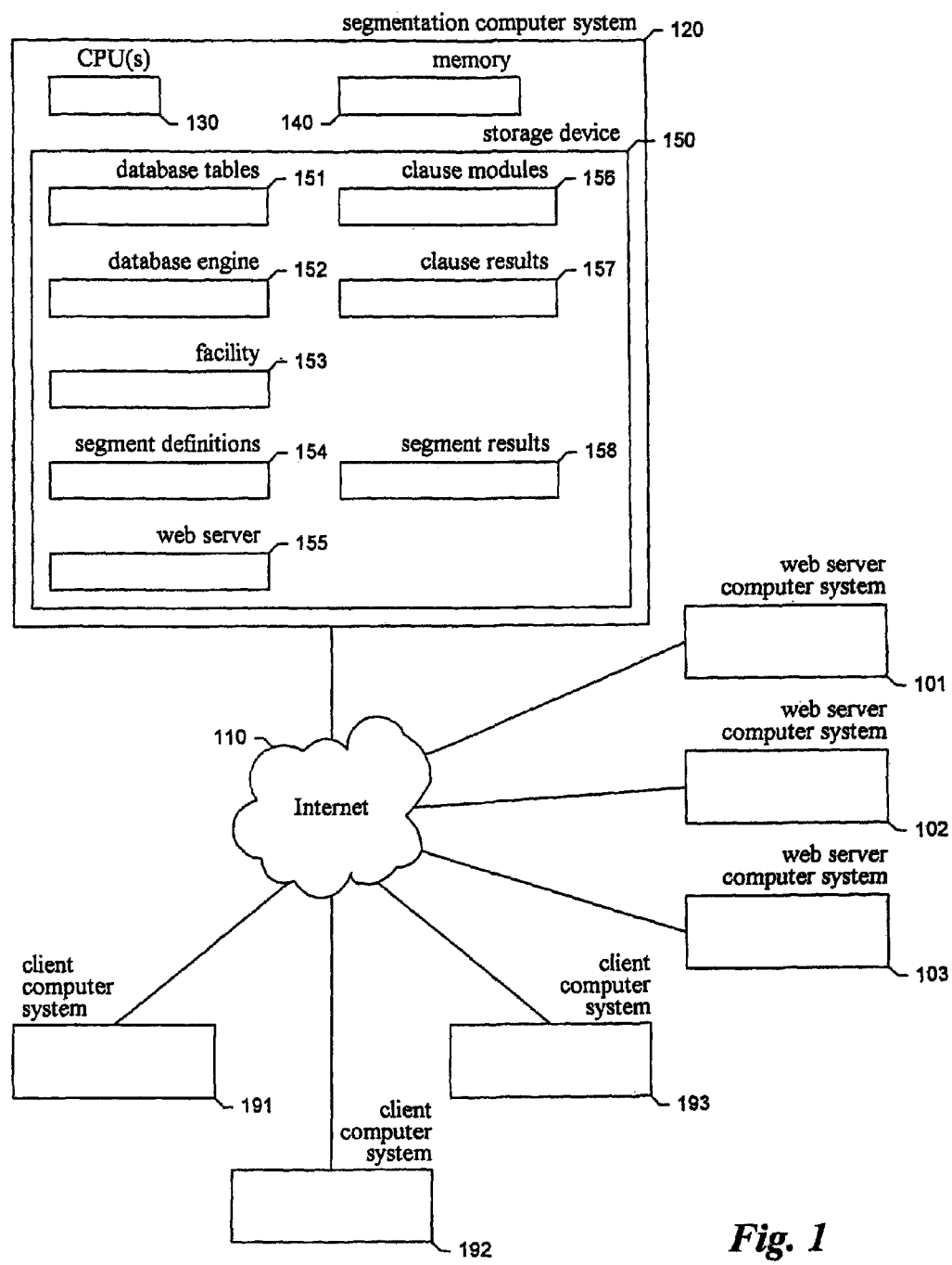
FIG. 1 is a block diagram showing a typical environment in which the facility operates.

A software facility for segmenting individuals who are members of a population, such as individuals visiting one or more web sites, ("the facility") is described. In some embodiments, the facility provides tools that enable a user who is not a programmer to define new segments and establish the tests used to automatically identify individuals who are members of the segment; takes advantage of highly-efficient techniques for processing the large quantities of data required to populate segments; and/or provides a hierarchical organization of segments that can be used to more easily and intuitively for selecting segments, such as by selecting a segment whose data is to appear in a report.

In some embodiments, the facility provides tools that enable a user who is not a programmer to define new segments and establish the tests used to automatically identify individuals who are members of the segment. These tools enable a virtually any user to define a new segment by (1) selecting plain-language characterizations of conditions, also called "clauses" from a preexisting list of conditions; (2) specifying values for any variables contained by a selected clause; and (3) selecting logical operators to be used to combine the selected clauses into a membership test for the new segment. For example, to define a new segment for male users who registered in the past week, a user may (1) select plain languages characterizations of two clauses, "User property or characteristic" and "Users who performed an Event"; (2) in the User property or characteristic clause, select a "gender" value for a "attribute" variable and a "male" value for a "value" variable; and (3) select the AND logical operator to combine the User property or characteristic and Users who performed an Event clauses into a membership test for the segment.

In some embodiments, the facility takes advantage of highly-efficient techniques for processing the large quantities of data required to populate segments. These are based upon a "column-chunking" approach, where large database tables containing data used to populate segments—also called "fact tables"—are broken into small pieces called "column chunks," which may be loaded into memory only a few at a time as part of the process of populating segments. In particular, column chunks may be simultaneously differentiated on up to four separate bases: (1) the identity of the table from which the data in the piece is taken; (2) the identity of the column of that table from which the data in the piece is taken; (3) a date to which the data relates; and (4) an arbitrary group of users to which a user to whom the data relates belongs, such as a group of users whose user identifiers all hash to the same hash values. Because segment membership is determined on a per-user basis, column chunks for different arbitrary groups of users may be loaded with complete mutual exclusivity, reducing the amount of memory needed accommodate simultaneously-loaded data in physical memory, and/or reducing performance degradation caused by paging virtual memory contents into and out of physical memory. Additional processing techniques include a resource request model, where segments are populated using recursive asynchronous requests.

In some embodiments, the facility provides a hierarchical organization of segments that can be used to more easily and intuitively for selecting segments, such as by selecting a segment whose data is to appear in a report. The facility provides various reports that employ segments, including reports on particular user characteristics or attributes that are filtered to include only the characteristics or attributes of users in one or more segments, and reports showing information about the populations of one or more segments.

FIG. 1 is a block diagram showing a typical environment in which the facility operates. In accordance with the facility, a segmentation computer system 120 provides segmentation services. In some embodiments, the segmentation computer system receives data for use in populating segments from other computer systems. In some embodiments, such data takes the form of web server log contents received from web server computer systems 101-103 via the Internet 110 or another network. Extraction of such web server log contents from web server computer systems is discussed in greater detail in U.S. patent application Ser. No. 09/613,403 filed on Jul. 11, 2000, which is hereby incorporated by reference in its entirety. In some embodiments, the facility creates new segment definitions based upon interactions with users of the facility using client computer systems, such as client computer systems 191-193, which also communicate with the segmentation computer system via the Internet 110 or another network. Further, users of the facility may use client computer systems to request reports that incorporate information about segment populations.

The segmentation computer system 120 typically includes one or more central processing units ("CPUs") 130 for executing computer programs; a computer memory 140 for storing programs and data—including data structures—while they are being used; and a persistent storage device 150, such as a hard drive, for persistently storing programs and data. In particular, the storage device contains database tables 151 that contain data used by the facility to perform segment population; a database engine 152 for accessing information in the database tables; the facility 153; segment definitions 154 created by users and/or implementers of the facility; a web server 155 for use in communicating with the client computer systems; clause modules 156 each containing program and/or higher-level logic for determining whether a particular clause is satisfied; a body of clause results 157 containing information indicating, for each of one or more clauses, the users that satisfy the clause; and segment results 158 containing information indicating, for each of one or more segments, which users are members of the segment. As will be apparent to one of ordinary skill in the art, the storage device and memory may have various other contents, not shown. Further, data may be transferred between persistent storage and memory, and between individual storage devices, for purposes such as optimizing the availability of particular data and safeguarding the persistence of particular data. Placing particular data in the storage device or memory is referred to herein as "storing" the data, while moving particular data from the storage device to the memory is referred to herein as "loading" the data.

While computer systems configured as described above are typically used to support the operation of the facility, one of ordinary skill in the art will appreciate that the facility may be implemented using devices of various types and configurations, and having various components.

Figure 2:
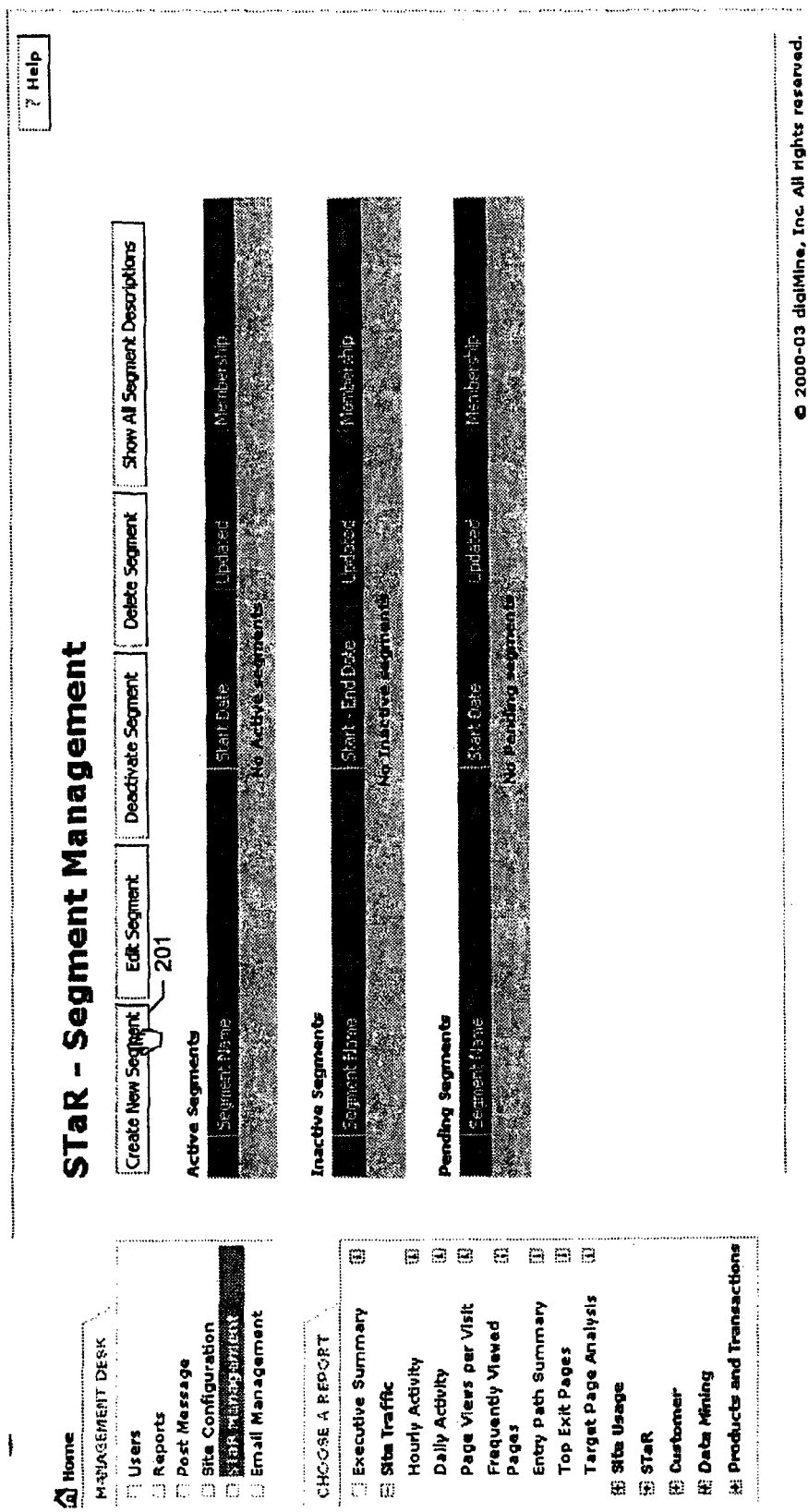

FIGS. 2-9 are display diagrams showing aspects of a typical user interface for creating segment definitions provided by some embodiments of the facility. FIG. 2 is a display diagram showing the segment creation user interface in a first state. In the display shown in FIG. 2, in addition to other options, a user of the facility may select button 201 in order to create a new segment definition.

FIG. 3 shows a subsequent display of the segment creation user interface after the user of the facility selects button 201. The display includes controls 301 for specifying various aspects of the segment definition. These include a segment name field 310 into which the user has entered the text "Sample Segment A" 311. The controls further include a criteria list box 320 for selecting a criterion—also called a clause—for inclusion in the segment definition—that is, a test that is to be applied to users to determine whether they are members of the segment being defined. Below list box 320 are displayed typical clauses 321-327 made available by the facility. Those skilled in the art will appreciate that various other clauses may similarly be included.

FIG. 4 is a display diagram showing a subsequent display of the segment creation user interface. Among controls 401, it can be seen that the user of the facility selected a "Users who performed an Event" clause 421 in the criteria list box 420. The controls further include clause-specific controls 430 that are displayed in response to the selection. These include an event field 432 used to specify the particular event whose performance is to be tested; a period field 433 used to specify the period of time over which performance of the event is to be tested, and a directional field 431 used to specify whether a user will satisfy this clause if they have or have not performed the event within the period. These three fields are said to correspond to "variables" of the clause, for which the user specifies "values." It can be seen by values 434-436 specified by the user of the facility that a user will satisfy this clause if they have performed a Register event within the last one week.

FIG. 5 is a display diagram showing a subsequent display of the segment creation user interface. In order to save the clause specified above, the user of the facility selects a Save Condition button 541. To cancel creation of this condition, the user of the facility selects a Cancel button 542.

FIG. 6 is a display diagram showing a subsequent display of the segment creation user interface after the user of the facility selects the Save Condition button 541. This display shows a user type field 650 that the user of the facility may use to specify a particular type of users as the only users that are eligible to be members of the segment being defined. It can be seen by the selection of the "All users" value 651 in user type field 650 that eligibility for this segment is not restricted to any particular user type. The display further shows a plain-language characterization 652 of the clause created above, as well as a control 653 that the user of the facility may select to edit this previously-created clause, and a control 654 that the user of the facility may select to delete this previously-created clause. The display further includes an indication 658 that the segment will be populated each week. The display further includes a control 659 that the user of the facility may select in order to add another clause to the segment being defined.

Figure 7:
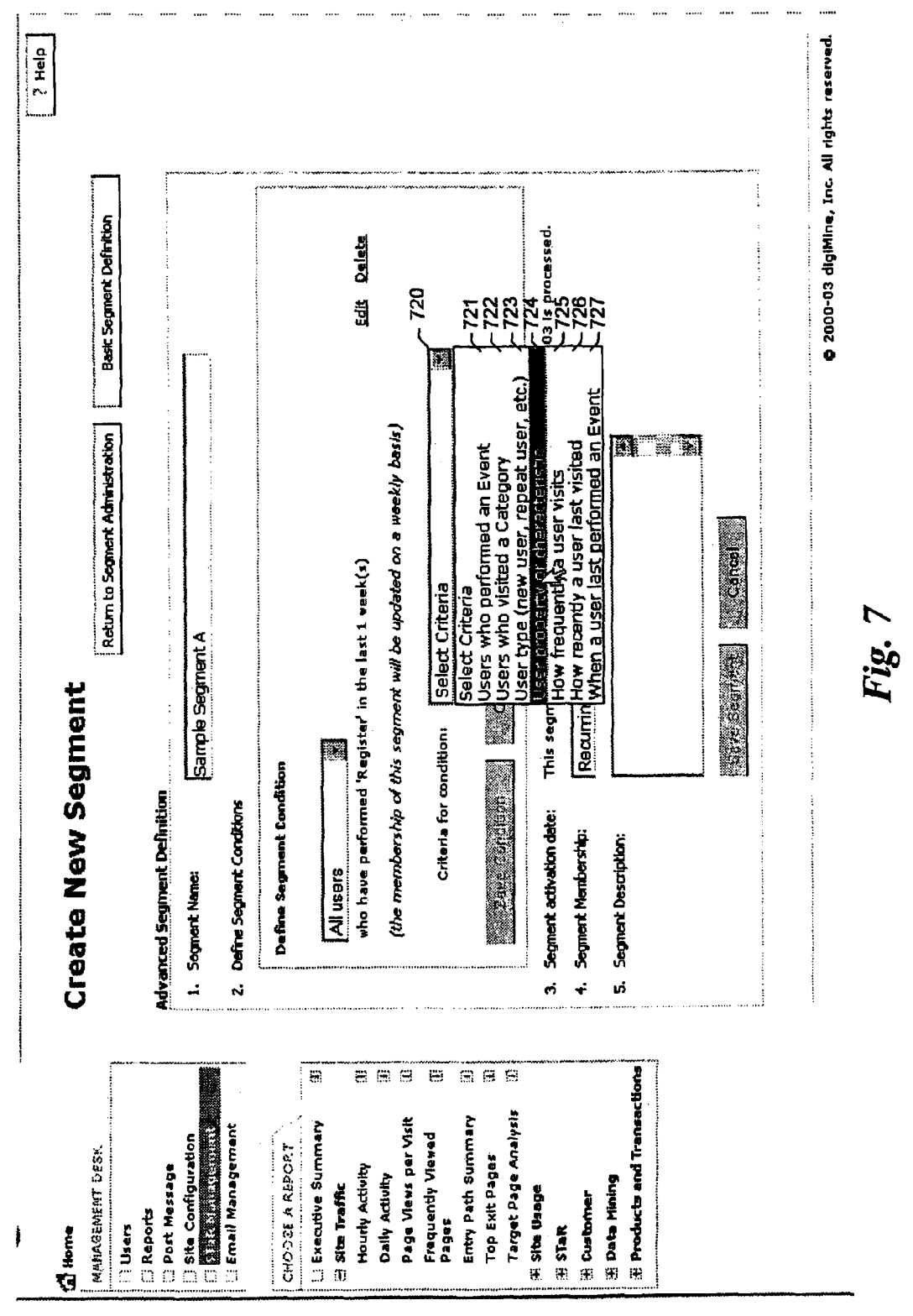

FIG. 7 is a display diagram showing a subsequent display of the segment creation user interface displayed in response to selection of control 659 by the user of the facility. This display includes the criteria list box 720, used by the user of the facility to select a criterion for a second clause of the segment definition.

Figure 8:
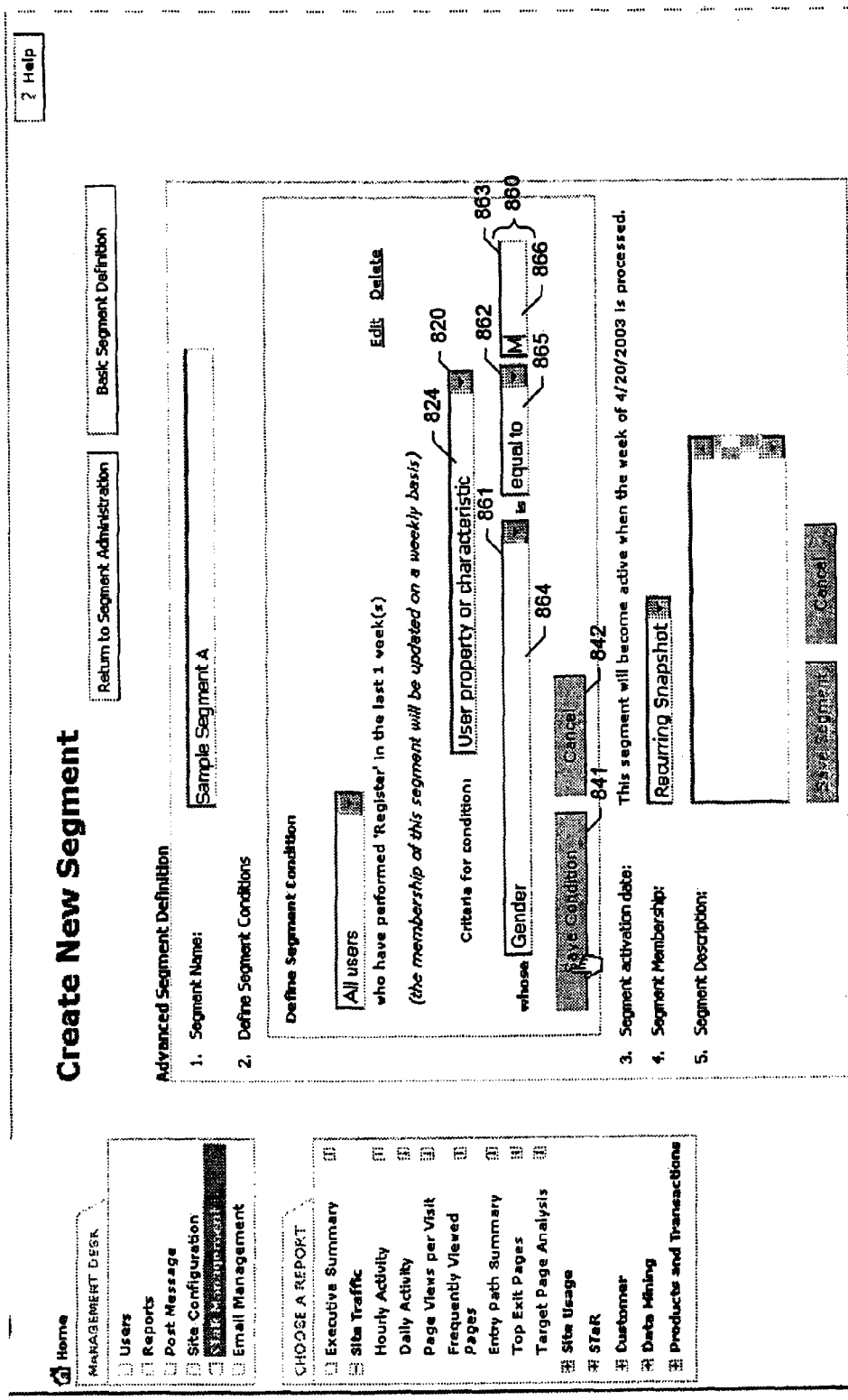

FIG. 8 is a display diagram showing a subsequent display of the segment creation user interface after the user of the facility selects a "User property or characteristic" criterion 724. The contents of the criteria list box 820 show that the user of the facility has selected the "User property or characteristic" criterion 824. The display further includes controls 860 for specifying values 864-866 for three variables of this criterion: a property field 861 for specifying a particular user property; a relationship field 862 for specifying a relationship between that property and a value specified in a value field 863. From the contents of these three controls, it can be seen that the user of the facility has specified that this clause will be satisfied by users whose gender is male. The user of the facility may select a save condition button 841 in order to save this clause, or a cancel button 842 to cancel the creation of this clause.

Figure 9:
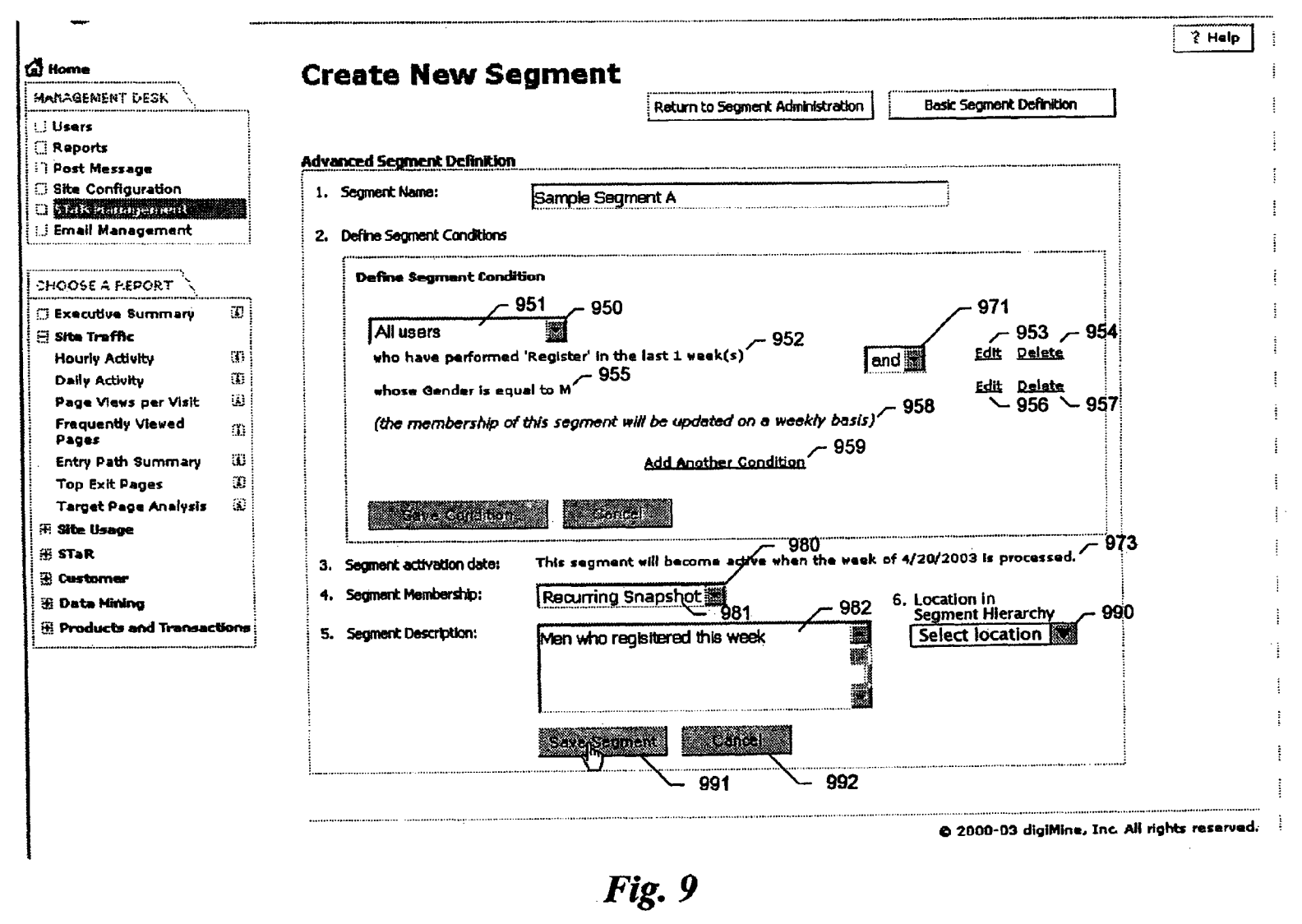

FIG. 9 is a display diagram showing a subsequent display of the segment creation user interface after the user of the facility selects the save condition button 841. It can be seen that this display includes a plain-language characterization 955 of the second clause, as well as a control 956 for editing this second clause and a control 957 for deleting this second clause. The display further includes an indication 973 of when the segment will become active and first be populated. The display further includes a population strategy list box 980 that the user of the facility may use to select a population strategy for this segment. The user of the facility may typically select between the following population strategies: one-time snapshot, recurring snapshot, and cumulative. Where the user of the facility selects the one-time snapshot population strategy, the first time the segment is populated, the facility applies the segment definition to identify members of the segment of the facility. The population of the segment will not change at any future time. Where the user of the facility selects the recurring snapshot population strategy, the segment definition will be applied periodically, and the segment membership will include only those users that currently satisfy the segment definition, without regard for whether a user satisfied the segment definition at an earlier time. Where the user of the facility selects the cumulative segment population strategy, the facility applies the segment definition, and adds any users that currently satisfy the segment definition to the group of existing members of the segment. That is, a user that satisfied the segment definition at an earlier time but does not presently is still a member of the segment where this strategy is selected.

The display further includes a description field 982, into which the user of the facility may enter a textual description for the segment. The display further includes a select location button 990 that the user of the facility may select in order to select a location within a hierarchy used to organize defined segments. This display further includes a Save Segment button 991 that the user of the facility may select to save this segment, and a Cancel button 992 that the user of the facility may select in order to cancel creation of this segment.

FIG. 10 is a data structure diagram showing a sample segment definition that is typical of those created and used by the facility. A set 1000 of segment definitions is shown that includes segment definition 1010, corresponding to the segment whose creation is shown in FIGS. 2-9. The segment definition is comprised of lines 1011-1022. As is the case with additional data structure diagrams discussed below, the contents of this data structure diagram are shown in a manner designed to maximize comprehensibility, and are not necessarily representative of the form in which data is stored by all embodiments of the facility. As some examples, the facility may store data items in a different order, in binary vs. textual form, using data structures that have more complicated inter-relationships, and/or in a compressed and/or encrypted form.

Line 1011 shows that the segment is identified by the number 5. Line 1012 shows that the name of the segment is "sample segment A." Line 1013 shows that the description of the segment is "men who registered this week." Line 1014 shows that the segment's population strategy is recurring snapshot. Lines 1016-1022 contain the definition of the segment. Line 1016 shows that the clause shown on lines 1017-1019 is combined with the clause shown on lines 1020-1022 using the Boolean AND operator. Lines 1017-1019 show that the first clause, clause 5.1, is a clause type 1—Users who performed an event—for which the following values are specified: have, Register, one week. Lines 1020-1022 show that the second clause, clause 5.2, is a clause type 4—User property or characteristic—for which the following values are specified: Gender, equal to, M.

FIGS. 11-15 are data structure diagrams showing sample database tables that are typical of those from which the facility extracts information for use in populating segments. FIGS. 11-12 are data structure diagrams showing two instances of a first table, table T1. FIG. 11 is a data structure diagram showing a first instance of table T1 for a first date, date D1. This table instance contains data about a set of events performed by users browsing a subject web site on a particular date, date D1. Each row 1111-1118 corresponds to a single event performed by a user. While a more typical event table instance would have a much larger number of rows, a small table is shown here for the sake of clarity. Each row is divided into four columns: a user id column 1101, also referred to as column C1; an event column 1102, also referred to as column C2; a time column 1103, also referred to as column C3; and a result column 1104, also referred to as column C4. The user id column contains a unique identifier assigned to the user who performed the event documented in the row. For example, row 1114 contains the value 2163 in the user id column. The event column contains an indication of the kind of event performed by the user. For example, row 1114 contains an indication that the user performed a white papers event, i.e., made a request for white paper documents available on the subject web site. The time column contains the time at which the event was performed. For example, row 1114 contains the time 00:10:21 in the time column. The result column contains an indication of whether the event performed by the users succeeded. For example, in row 1114, the result column contains an indication that the event succeeded.

FIG. 12 is a data structure diagram showing a second instance of table T1 for a second date, date D2. It can be seen that this table instance 1200 contains the same columns as the instance of table T1 for date D1 shown in FIG. 11. The rows contained in this table instance each correspond to an event performed by a user on date D2. For example, from row 1221, it can be seen that the user having user id 2163, who successfully performed event white papers at 00:10:21 on date D1, also successfully performed a register event at 00:05:11 on date D2.

FIGS. 13 and 14 show instances of a second database table, table T2. Rows of table instance 1300 each correspond to a visit by a user to a particular category of the subject web site. Each row is divided into three columns: a user id column 1301, also referred to as column C1; a category visited column 1302, also referred to as column C2; and a time column 1303, also referred to as column C3. FIG. 14 is a data structure diagram showing a second instance of table T2 for a second date, date D2.

FIG. 15 is a data structure diagram showing a third table, table T3, that does not have separate instances for each date. Each row of table T3 contains properties or characteristics for a single user. Each row is divided into four columns: a user id column 1501, also referred to as column C1; an age column 1502, also referred to as column C2; a gender column 1503, also referred to as column C3; and a country column 1504, also referred to as column C4. The age column contains the user's age. For example, in row 1511, the age column contains the age 62. The gender column contains the user's gender. For example, in row 1511, the gender column contains the gender male. The country column contains the user's country. For example, in row 1511, the country column contains the country United States.

FIGS. 16-21 are data structure diagrams showing column data structures that the facility extracts from database tables for the purpose of populating segments. The facility typically only extracts such column data structures from database table columns containing information upon which one or more defined segments depend for their population. In one embodiment, these columns are extracted by executing, for each column to be extracted, a SELECT SQL query specifying no row filtering clause.

FIGS. 17-18 are data structure diagrams showing column data structures extracted from the T1D1 database table instance shown in FIG. 11. FIG. 17 is a data structure diagram showing a column data structure extracted from the user id column of the database table instance shown in FIG. 11. This column data structure 1700, hereafter referred to as column T1C1D1, contains all of the entries from column 1101 in FIG. 11, in the same order as they occur there. For example, entry 1714 of the column data structure contains the value 2163, which is the same value contained in the user id column of row 1114 of the database table. FIG. 18 similarly shows the contents of column data structure T1C2D1, containing each of the entries appearing in the event column of the instance of the first database table for date D1, that is, column 1102 in FIG. 11.

FIG. 16 is a data structure diagram showing a hash column constructed by the facility based upon the T1C1D1 column data structure shown in FIG. 17. This hash column data structure 1600, referred to as T1D1 hash column, contains one value for each value in the T1C1D1 column. That value in the hash column is the result of applying a user id hashing function to the user id value occurring in the corresponding location of the T1C1D1 column, that is, the user id column. For example, it can be seen that entry 1614, corresponding to entry 1714 in column T1C1D1, contains the hash value 1, calculated from the user id value 2163. A particular hashing function is typically selected that evenly divides the user ids in use into an appropriate number of hash values, as is discussed further below.

FIGS. 20 and 21 are data structure diagrams showing similar column extractions from the instance of table T1 for date D2, and FIG. 19 shows a hash column generated based upon the contents of the user id column shown in FIG. 20.

FIGS. 22-29 are data structure diagrams showing data chunk data structures generated from the column data structures shown in FIGS. 16-21. Each column chunk data structure corresponds to a set of entries extracted from a column data structure all having the same hash value. The facility typically extracts a column chunk data structure for each hash value from each column data structure.

FIG. 22 is a data structure diagram showing a column chunk extracted from column data structure 1700 shown in FIG. 17. In particular, the H1T1C1D1 column chunk 2200 contains the entries in column data structure 1700 corresponding to entries of the T1D1 hash whose value is 1. For example, it can be seen that entry 2214, having the value 2163, is the first entry in the H1T1C1D1 column chunk 2200, and that this value is contained in 1714 of the T1C1D1 column 1700, which corresponds to the first entry of the T1D1 hash column 1600 containing the hash value 1. The other entries 2215-2217 of column chunk 2200 similarly correspond to entries of the T1C1D1 column corresponding to the entries of the T1D1 hash whose hash value is 1. In a similar manner, the H1T1C1D1 column chunk 2300 shown in FIG. 23 contains the corresponding entries from the T1C2D1 column data structure 1800 shown in FIG. 8.

The facility typically generates a set of column chunks for each column, each column chunk in the set having a different hash value. FIGS. 24 and 25 are column chunks that, like column chunks 2200 and 2300 shown in FIGS. 22 and 23, originate from the T1C1D1 column 1700 and the T1C2D1 column data structure 1800. Column chunks 2400 and 2500 in FIGS. 24 and 25 differ from column chunks 2200 and 2300 in that they contain the entries of these columns corresponding to entries of the T1D1 hash column containing the hash value 2. For example, it can be seen that entry 2412 in column chunk 2400 contains the value 4126, which is also the value contained by entry 1712 of the T1C1D1 column 1700, which corresponds to entry 1612 of the T1D1 hash 1600 that contains the hash value 2. The remaining column chunks corresponding to the T1C1D1 and T1C2D1 columns and hash values greater than 2 are omitted for brevity.

FIGS. 26-29 are similar to FIGS. 22-25, and contain column chunks extracted from the T1C1D2 and T1C2D2 columns shown in FIGS. 20 and 21. The facility typically stores the generated column chunks in binary form in one or more file system files. The facility typically further stores an index indicating, for each stored column chunk, the identity of the file that contains it, and the location in the file at which it begins.

Figure 30:
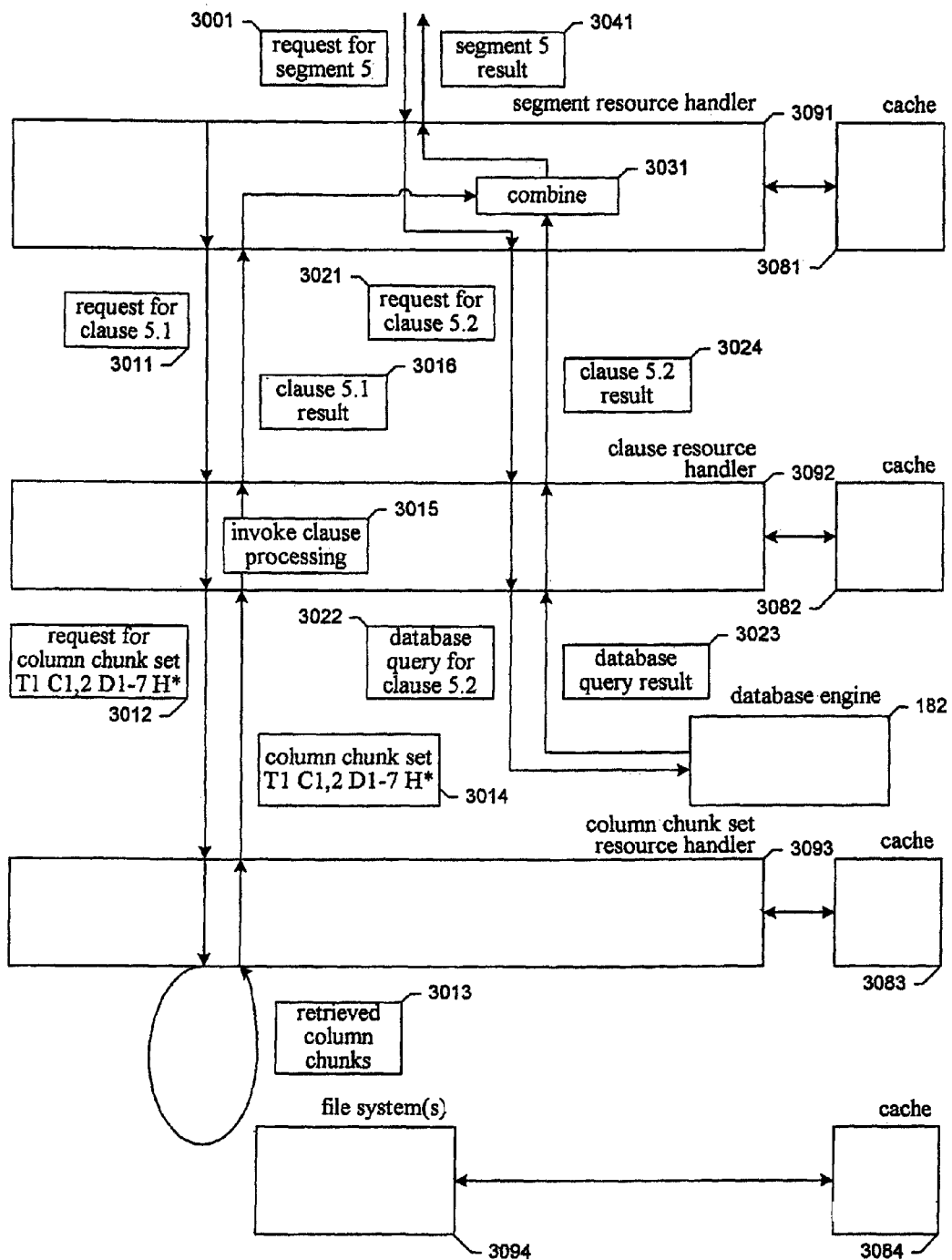
FIG. 30 is a data flow diagram depicting the facility's population of a sample segment.

FIG. 30 is a data flow diagram depicting the facility's population of a sample segment. The diagram depicts data flow between three components of the facility: a segment resource handler 3091 that receives and processes segment requests; a clause resource handler 3092 that receives and processes clause requests; and a column chunk set resource handler 3093 that receives a processes column chunk set requests. The operation of each of these three components is described in greater detail below in conjunction with FIGS. 31-33.

The data flow begins with a request 3001 to populate segment 5 whose definition is shown in FIG. 10. This request is directed to the segment resource handler 3091. Such a request typically originates with either a direct consumer of the segment to be populated, such as a module for generating a report that depends upon the current population of the segment, or with an indirect agent, such as a chron job that periodically requests that one or more segments be populated. In some embodiments, the request is in the first instance directed to the segment resource handler, which contains specialized logic for supplying segment resources. In other embodiments, this request and other requests, such as requests 3011 and 3012 discussed below, are submitted via a generic resource handler, which dispatches the request to the proper specialized resource handler. In some embodiments, the requests submitted to the segment resource handler and other specialized or generic resource handlers are submitted asynchronously, permitting the submitter to continue execution while the request is being processed, and be notified with a callback when the request is completed and the requested resource is available.

The request received by the segment resource handler contains information identifying the segment to be populated, such as the segment identifier constituting a reference to the segment's definition 1010. When the segment resource handler receives the request, in some embodiments it checks a cache 3011 maintained for the segment resource handler to see if the cache contains a segment result for the requested segment that can be used to satisfy the request without having to populate the segment. Where the cache does not contain a segment result that can be used to satisfy request 3001, the segment resource handler uses the segment definition to identify all of the clauses utilized in the segment definition. In the example, the segment resource handler identifies clause 5.1, which appears on lines 1017-1019 of the definition for segment 5, and clause 5.2, which appears on lines 1020-1022. Accordingly, the segment resource handler submits two requests to the clause resource handler 3092: a request 3011 for clause 5.1, and a request 3021 for clause 5.2. As noted above, these requests may be submitted either directly to the clause resource handler, or through the generic resource handler. They may be submitted asynchronously.

When the clause resource handler 3092 receives request 3011, it checks its cache 3082 to determine whether this cache contains a clause result that can be used to satisfy request 3011. Where the cache does not contain a suitable clause result, the clause resource handler uses the clause definition from the segment definition, together with metadata for the clause type referenced in the clause definition, to identify a set of column chunks needed to identify users who satisfy the clause. The clause resource handler then submits a request 3012 for this column chunk set to a column chunk set resource handler 3093. In the example, the clause resource handler determines that the column chunk set needed to process the clause are those from table 1, columns 1 and 2, dates 1 through 7, all hash values. This requested column chunk set is hereafter denoted T1 C1,2 D1-7 H*.

When the column chunk set resource handler receives request 3012, it checks its cache 3083 for column chunks among the requested set. For any column chunks not available in cache 3083, the column chunk resource handler retrieves these column chunks 3013 from the file system files 3094 where they were stored during the column chunking process. In the example, column chunks 2200, 2300, 2600, and 2700 are retrieved for hash value 1; column chunks 2400, 2500, 2800, and 2900 are retrieved for hash value 2; and additional column chunks (not shown) are retrieved for the remaining hash values shown in the hash columns for instances of table T1, such as hash column 1600 in FIG. 16 and hash column 1900 in FIG. 19. The facility also retrieves the corresponding column chunks for days D3-D7 (not shown). In some embodiments, the column chunk set resource handler uses an index created during the column chunking process to identify the file and position within the file at which each column chunk to be retrieved is contained.

The column chunk set resource handler assembles retrieved column chunks 3013 into a column chunk set 3014 satisfying request 3012, and passes this column chunk set back to the clause resource handler. In step 3015, the clause resource handler invokes a routine that executes against the returned column chunk set 3014 in order to evaluate the clause for each user. The clause resource handler typically selects a routine optimized specifically for evaluating clauses of the same type as the requested clause. The clause resource handler passes the clause result 3016 generated in this manner back to the segment resource handler. In some embodiments, the clause result is a bit array containing a bit for each user that indicates whether or not the user satisfies the clause.

When the segment resource handler receives clause result 3016, it combines this clause result in 3031 with any other clauses defined within the segment definition for the requested segment. In the example, the result 3016 for clause 5.1 is combined with a clause result for clause 5.2.

When the clause resource handler receives request 3021 for clause 5.2, it determines that, because the clause depends upon user properties or characteristics contained in a single database table of manageable size, a result can be generated efficiently for this clause without reference to any column chunks by issuing a database query against the database table containing this user property or characteristic information. Accordingly, the clause resource handler issues a database query 3022 for this clause. The database query is directed to database engine 152. The database query is a query against table T3, shown in FIG. 15, and specifies the retrieval of the rows of table T3 containing the value "M" in gender column 1503. The database engine returns a database query result 3023. The clause resource handler uses the query result 3023 to generate a clause result 3024 in the same bit array form as clause result 3016 for clause 5.1. After both clause results are received at the segment resource handler, the segment resource handler in step 3031 applies the AND logical operator specified in line 1016 of the segment definition in a bitwise manner to combine the two clause results into a segment result 3041, which is returned to the requester that generated request 3001.

It should be noted that a segment definition may include any number of clauses that the clause resource handler generates using column chunk sets, direct database queries, or other clause evaluation techniques. Clauses generated by the clause resource handler in any of these manners may be combined by the segment resource handler in order to generate a segment result.

Figure 31:
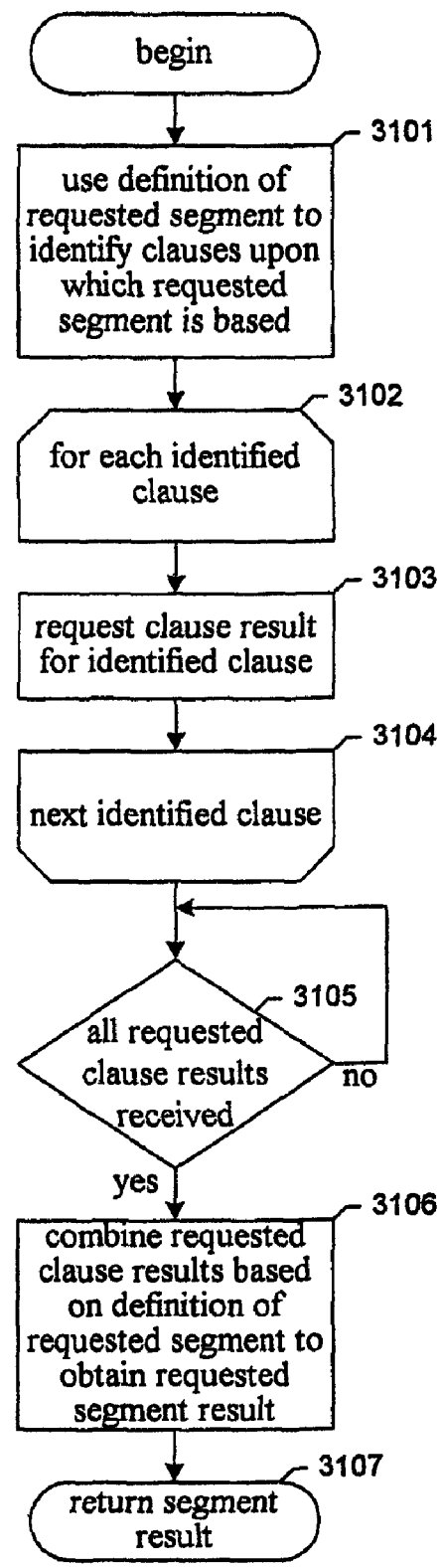
FIG. 31 is a flow diagram showing steps performed by the facility in the segment resource handler when it receives a segment population request for a particular segment.
Figure 32:
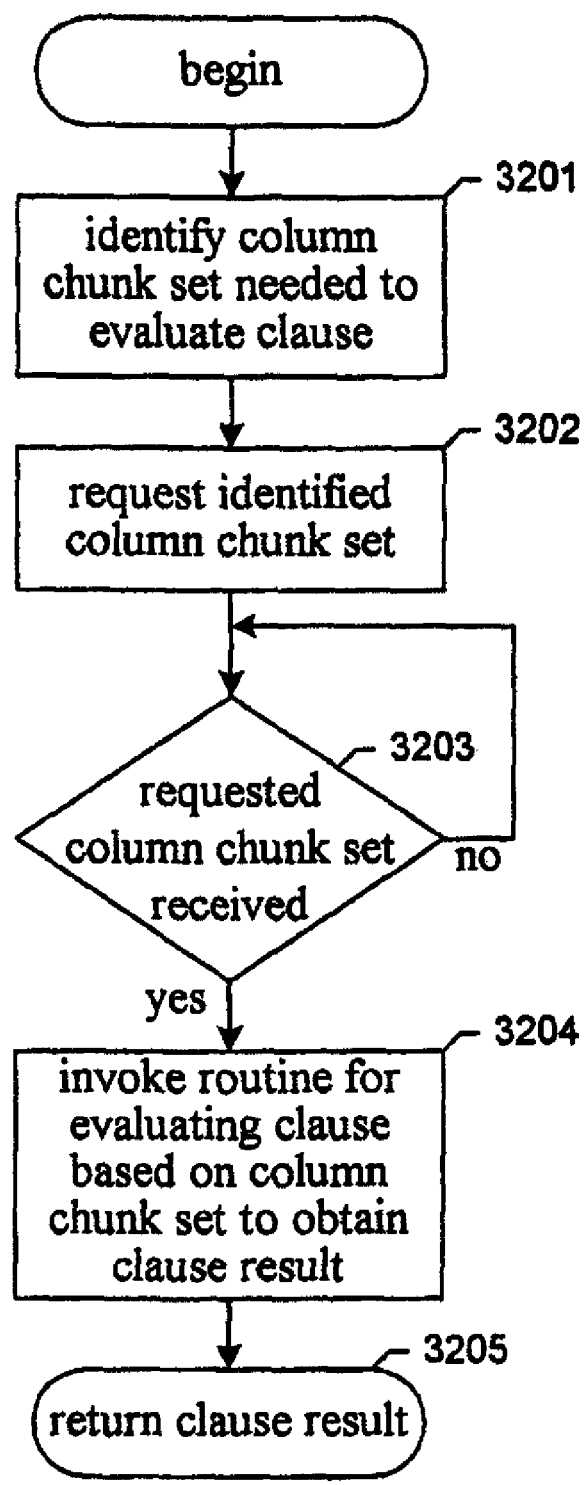
FIG. 32 is a flow diagram showing steps typically performed by the facility in the clause resource handler in order to process a request for a particular clause.
Figure 33:
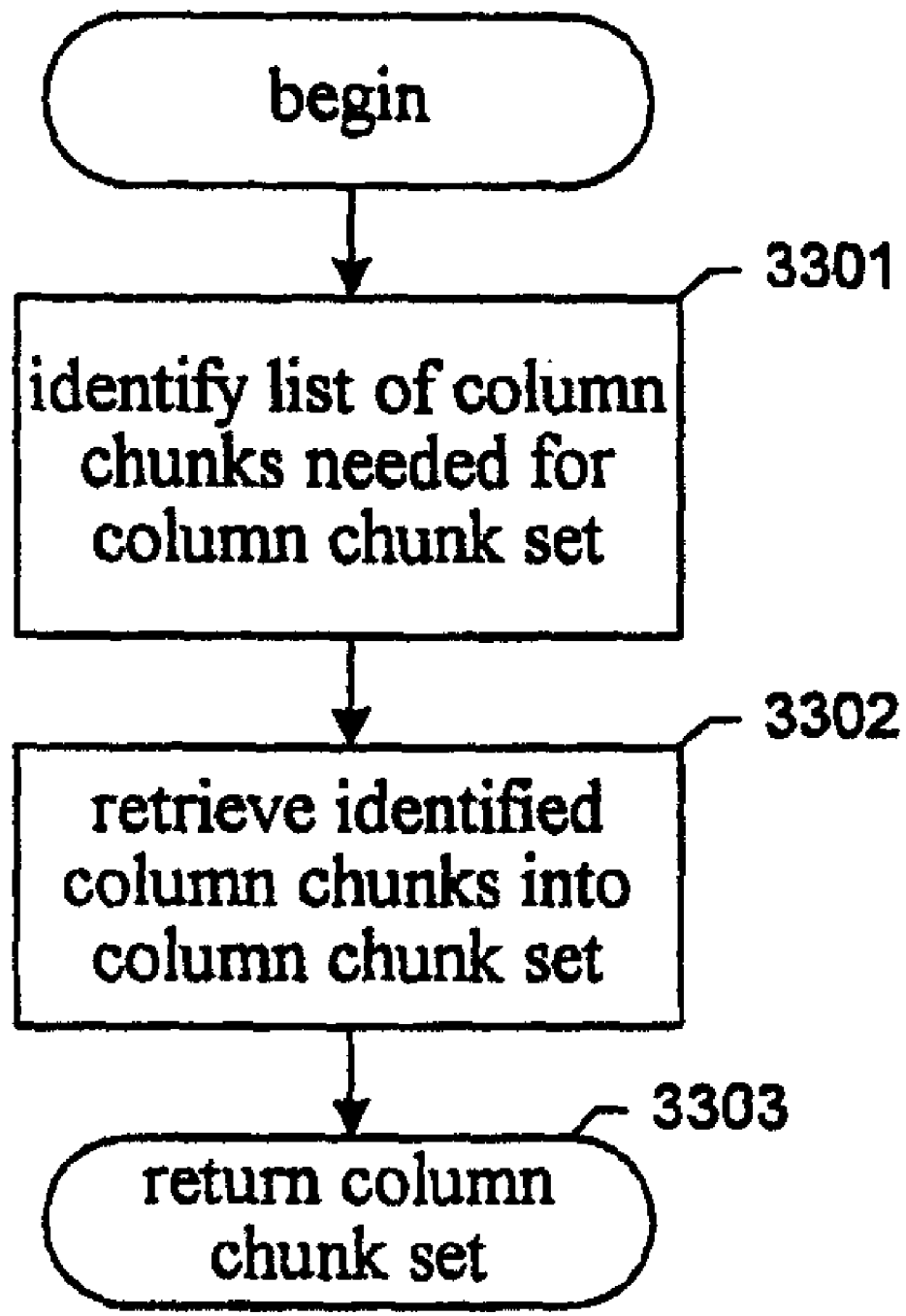
FIG. 33 is a flow diagram showing steps typically performed by the facility in the column chunk set resource handler to process a particular column chunk set request.

FIGS. 31-33 are flow diagrams showing typical steps performed by the facility in the three specialized resource handlers. FIG. 31 is a flow diagram showing steps performed by the facility in the segment resource handler when it receives a segment population request for a particular segment. In step 3101, the facility uses the definition of the requested segment to identify clauses upon which the requested segment is based. The facility performs steps 3102-3104 for each clause identified in step 3101. In step 3103, the facility requests a clause result for the current identified clause. In step 3104, if additional clauses remain to be processed, the facility continues in step 3102 to process the next identified clause, else the facility continues in step 3105. In step 3105, if all of the clause results requested in step 3103 have been received, then the facility continues in step 3106, else the facility continues in step 3105. In step 3106, the facility combines the clause results requested in step 3103 based upon the definition of the requested segment to obtain the requested segment result. In step 3107, the facility returns the requested segment result.

FIG. 32 shows steps typically performed by the facility in the clause resource handler in order to process a request for a particular clause. In step 3201, the facility identifies a column chunk set needed to evaluate the clause. In step 3202, the facility requests the column chunk set identified in step 3201. In step 3203, if the column chunk set requested in step 3202 has been received, then the facility continues in step 3204, else the facility continues in step 3203. In step 3204, the facility invokes a specialized routine optimized to evaluate the clause based upon the column chunk set requested in step 3202 to obtain a clause result for the clause. In step 3205, the facility returns the clause result.

FIG. 33 is a flow diagram showing steps typically performed by the facility in the column chunk set resource handler to process a particular column chunk set request. In step 3301, the facility identifies a list of column chunks needed to generate the requested column chunk set. In step 3302, the facility retrieves the column chunks identified in step 3301 into a column chunk set. In step 3303, the facility returns the resulting column chunk set.

While the flow diagrams discussed above depict their steps sequentially in a particular sequence and in a synchronous mode of execution for the sake of clarity, those skilled in the art will appreciate that these steps may be performed in a variety of a different manners. For instance, the steps may be performed in a different order, parallelized, performed asynchronously, etc.

Figure 34:
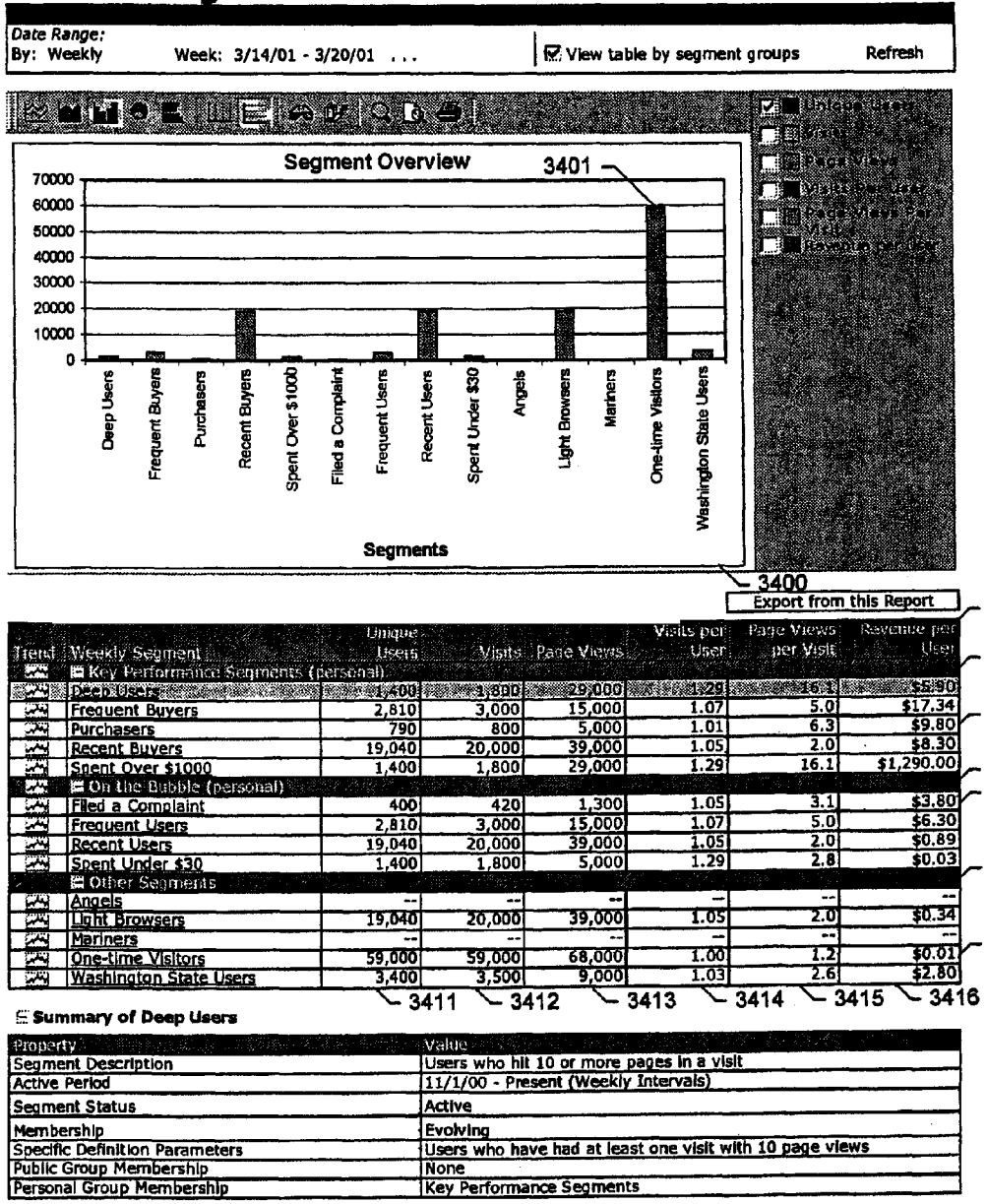
FIG. 34 is a display diagram showing a segment overview report.

FIGS. 34-40 are display diagrams showing sample reports that can be displayed by some embodiments of the facility using populated segments, such as those populated by the facility. FIG. 34 is a display diagram showing a segment overview report. The segment overview report contains information about all of the segments, and enables a user to readily compare segments to one another. This information includes a chart 3400 showing one or more metrics for each of the segments. For example, in the shown configuration, a vertical bar for each segment shows the number of unique users that are members of the segment. For example, bar 3401 shows the number of unique users that are members of the One-time Visitors segment. It can be seen that the user can interact with a number of checkboxes displayed next to the chart in order to display one or more of the following metrics in the chart for each segment: Unique Users, Visits, Page Views, Visits Per User, Page Views Per Visit, and Revenue per User. The information displayed for each segment also includes a table 3410. The table is divided into a number of sections by headings 3420, 3430, and 3440. These headings each correspond to a group of segments that can be expanded or collapsed by clicking on a control in their heading. As displayed, each group is expanded, so that the segments in each group are individually displayed under their group heading. For example, the One-time Visitors segment is displayed in row 3441 under the Other Segments heading 3440. Other segments in the Other Segments group are displayed under heading 3440, and segments of the Key Performance Segments group and On the Bubble segments are also displayed under their segment group headings. Each of the segments rows is divided into a number of columns containing a particular metric for each segment. These include a Unique Users column 3411, a Visits column 3412, a Page Views column 3413, a Visits per User column 3414, a Page Views per Visit 3415, and a Revenue per User column 3416. The display of segment names in a hierarchy under segment groups helps a user to more readily identify and select a particular segment. While FIG. 34 shows only a 2-level hierarchy of segments and segment groups, those skilled in the art will appreciate that such a hierarchy may have as many levels as desired.

Figure 35:
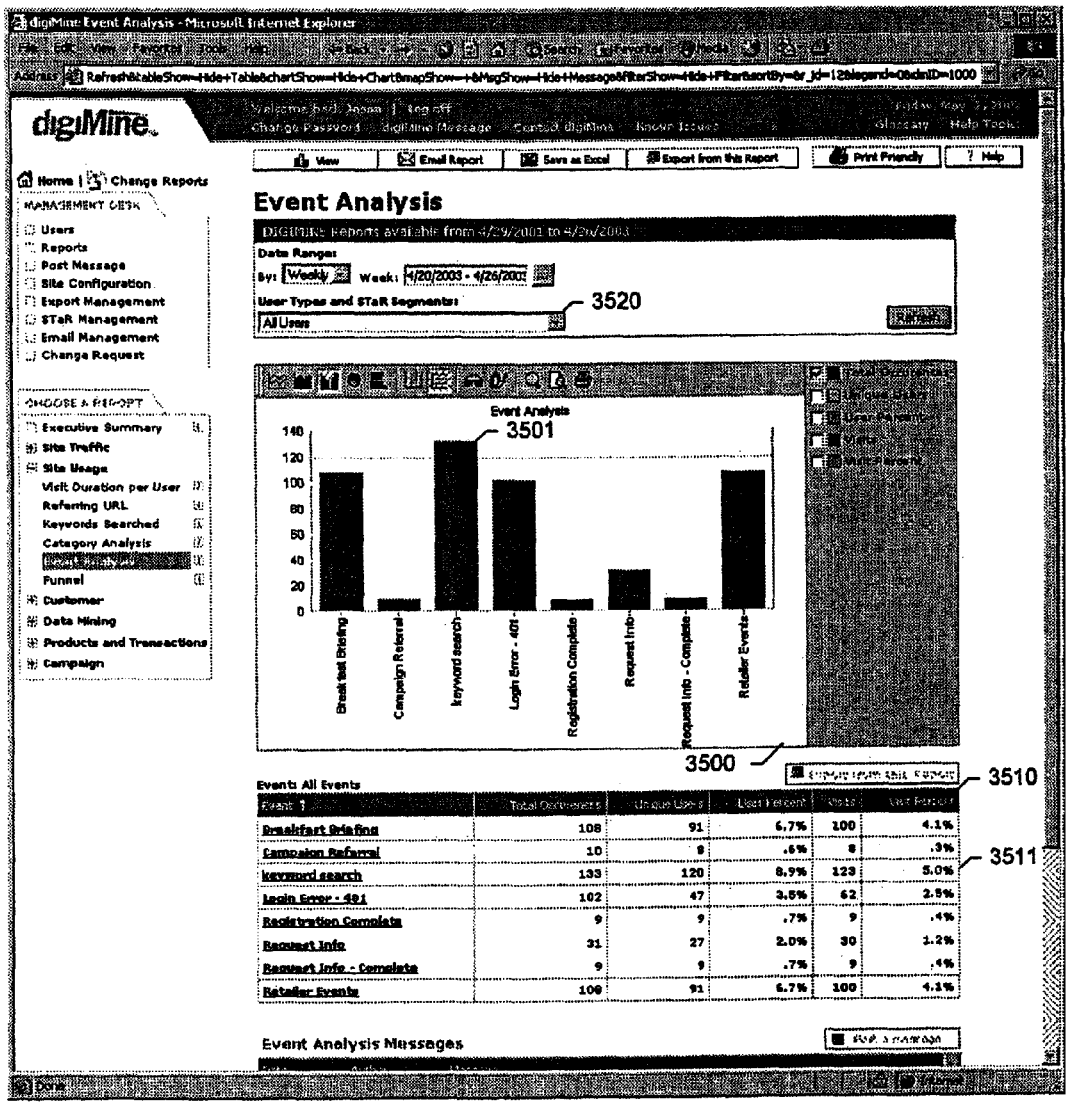
FIGS. 35-37 are display diagrams showing a report whose contents can be filtered using a populated segment.
Figure 36:
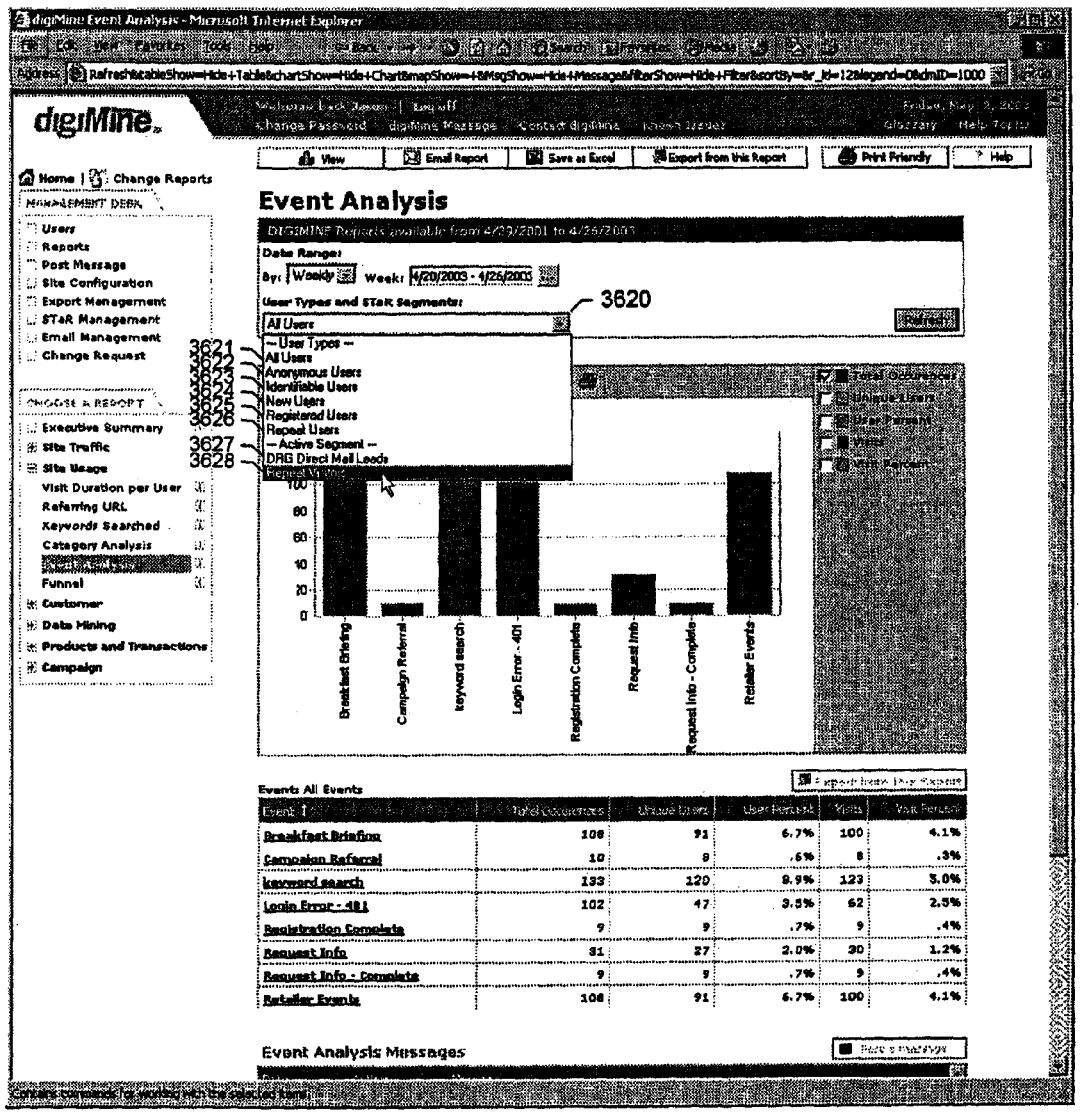
Figure 37:
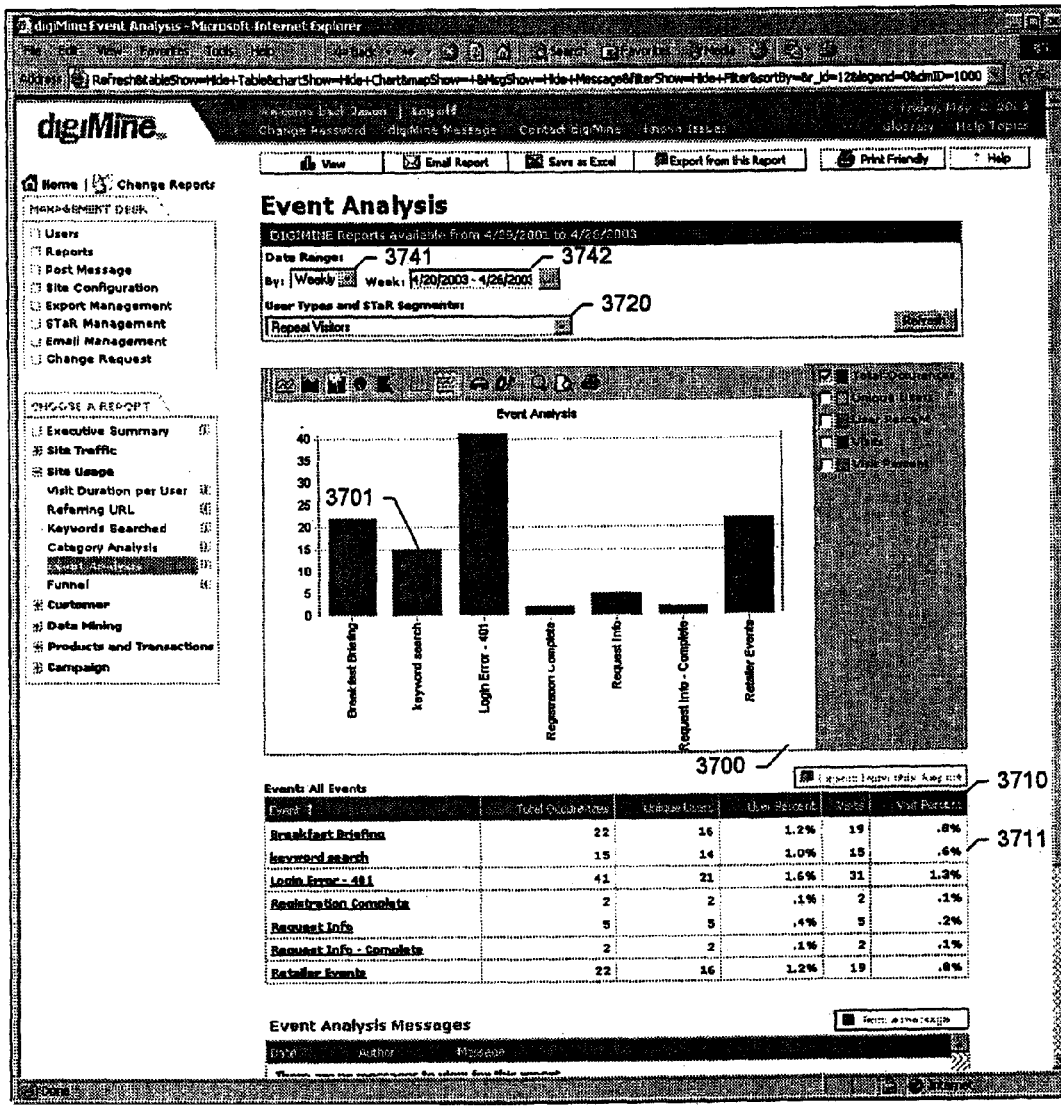

FIGS. 35-37 are display diagrams showing a report whose contents can be filtered using a populated segment. FIG. 35 shows this Event Analysis report in an initial state. In FIG. 35, a user type and segments field 3520 contains the entry All Users, indicating that the contents of the remainder of the report reflect data about all known users. A bar chart 3500 shows, for each of a number of different event types, the total number of occurrences of that event performed by all users. For example, bar 3501 shows the number of keyword search events performed by all users. The report also includes a table 3510, each row which corresponds to a particular event and indicates metrics for each event relating to all known users. For example, row 3511 relates to the keyword search event, and indicates that, among all known users, there were 133 total occurrences of this event, this event was performed by 120 unique users, this event was performed by 8.9% of all known users, this event was performed in 123 different user visits, and this event was performed in 5.0% of user visits.

FIG. 36 is a display diagram showing the event analysis report of FIG. 35 in a subsequent state. In FIG. 36, it can be seen that a user of the facility selected the user type and segments list box 3620, causing the facility to display a list of user types and segments by which the report contents can be filtered. These include user types 3621-3626 as well as user segments 3627 and 3628.

FIG. 37 is a display diagram showing the event analysis report shown in FIG. 36 in a subsequent state after the user of the facility selects a Repeat Visitors segment 3628 from the user type and segments list box 3620. In FIG. 36, it can be seen that the report contents in both chart 3700 and 3710 have been filtered to include only metrics relating to users who are members of the Repeat Visitors segment as selected in list box 3720. For example, it can be seen that bar 3701 indicates a much smaller number of keyword search events for the Repeat Visitors segment than are indicated by bar 3501 in FIG. 35 for all known users. Similarly, it can be seen that in row 3711 of table 3710 that each numerical metric for the keyword search event is smaller than the corresponding metric for all known users shown in row 3511 in FIG. 35.

The user of the facility may go on to select a new user type or segment from user type and segment list box 3720, and the report contents will instead be filtered by that user type or segment. The user of the facility may also modify date range fields to change the date range reflected by the report's contents, such as a frequency field 3741, and a date range field 3742. When the user of the facility enters values in these fields, the facility updates the report to reflect the newly-specified date range.

Figure 38:
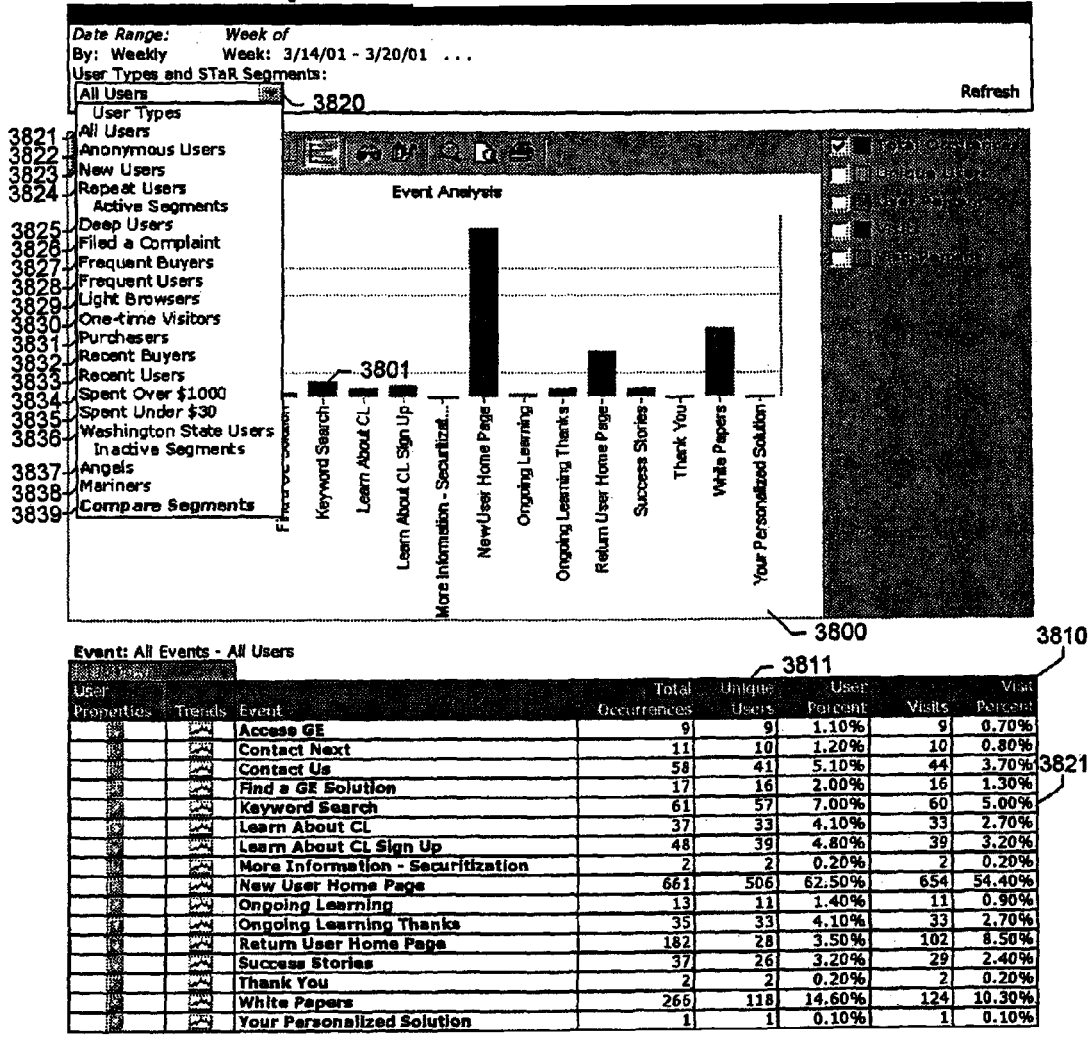
Figure 40:
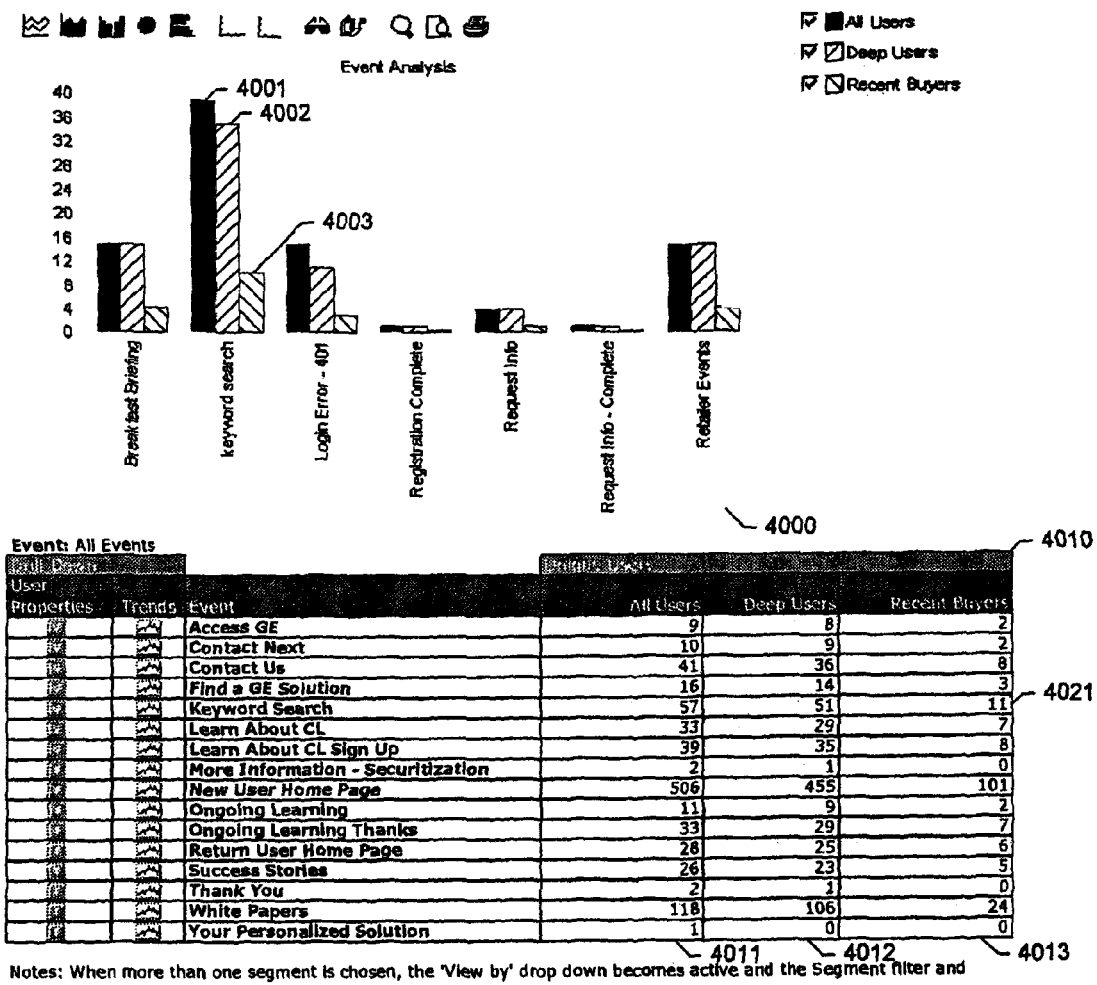

FIGS. 38-40 are display diagrams showing a sample report displayed by the facility that may be simultaneously filtered by multiple populated segments. FIG. 38 shows the sample report in an initial state. In FIG. 38, an event analysis chart 3800 and table 3810 show metrics relating to each of a number of different events performed by users among the group of all known users. The user of the facility can use user types and segments list box 3820 to select one or more user types of segments by which to filter these metrics. The user of the facility may select a user type 3821-3824, a segment 3825-3838, or a compare segments entry 3839 to filter by multiple segments.

FIG. 39 is a display diagram showing a segment selection window displayed by the facility when the user of the facility selects the compare segments entry 3839 from the user types and segments list box 3820. The user of the facility may use the segment selection window 3900 to select any number of user types and/or segments by which to filter the report shown in FIG. 38. In FIG. 39, the following user types and segments are selected: all users user type 3911, deep users segment 3921, and recent buyer segment 3928. The user of the facility may select a compare button 3941 to filter the event analysis report by these three user types and segments, or a select a cancel button 3942 to return to the display shown in FIG. 38.

FIG. 40 is a display diagram showing the report of FIG. 38 in a subsequent state after the user has selected compare button 3941. It can be seen by comparing FIG. 40 to FIG. 38 that each bar of chart 3800 in FIG. 38 has been replaced by three bars in FIG. 40. For example, the keyword search event has three bars: bar 4001 shows the number of unique users among all known users who performed the keyword search event; bar 4002 shows the number of users that are members of the Deep Users segment that performed this event; and bar 4003 shows the number of users that are members of the Recent Buyer segment that performed this event. In chart 4010, it can be seen that each row contains columns relating to each of the three selected user groups or segments: an All Users column 4011, a Deep Users column 4012, and a Recent Buyers column 4013. For example, row 4021 indicates that, for the keyword search event, 57 users among all known users performed this event; 51 users that are members of the Deep Users segment performed this event; and 11 users that are members of the Recent Buyers segment performed this event.

It will be appreciated by those skilled in the art that the above-described facility may be straightforwardly adapted or extended in various ways. While the foregoing description makes reference to preferred embodiments, the scope of the invention is defined solely by the claims that follow and the elements recited therein.

We claim:

1. A method in a computing system, having a memory and a processor, for exploring information relating to a population, comprising:
   displaying a graphical report reflecting information relating to the entire population;
   in conjunction with the graphical report, displaying a control enabling a user to select a named subset of the population among a plurality of named subsets of the population;
   receiving, with the processor, input indicating that the user has operated the displayed control to select a named subset of the population;
   in response to receiving the input, displaying in place of the graphical report reflecting information relating to the entire population a graphical report reflecting information relating to only the selected named subset of the population;
   displaying a control enabling a user to select one of a plurality of report types; and
   receiving input indicating that the user has operated the displayed control to select a report type,
   and wherein the displayed graphical report reflecting information relating to the entire population is of the selected report type.

2. The method of claim 1 wherein the displayed control enables a user to select a named subset of the population among a plurality of named subsets of the population organized into a hierarchy of population subsets.

3. The method of claim 1 wherein the displayed control enables a user to select two or more named subsets of the population among the plurality of named subsets of the population,
   and wherein the received user input indicates that the user has operated the displayed control to select two or more named subsets of the population,
   and wherein the graphical report displayed in place of the graphical report reflecting information relating to the entire population reflects information relating to only the selected named subsets of the population.

4. A computer-readable storage device whose contents, if executed by a computing system, cause the computing system to explore information relating to a population by:
   displaying a graphical report reflecting information relating to the entire population;
   in conjunction with the graphical report, displaying a control enabling a user to select a named segment of the population among a plurality of named segments of the population;
   receiving input indicating that the user has operated the displayed control to select a named segment of the population;
   in response to receiving the input, displaying in place of the graphical report reflecting information relating to the entire population a graphical report reflecting information relating to only the selected named segment of the population;
   displaying a control enabling a user to select one of a plurality of report types; and
   receiving input indicating that the user has operated the displayed control to select a report type,
   and wherein the displayed graphical report reflecting information relating to the entire population is of the selected report type.

5. The computer-readable storage device of claim 4 wherein the displayed control enables a user to select a named subset of the population among a plurality of named subsets of the population organized into a hierarchy of population subsets.

6. The computer-readable storage device of claim 4 wherein the displayed control enables a user to select two or more named subsets of the population among the plurality of named subsets of the population,
   and wherein the received user input indicates that the user has operated the displayed control to select two or more named subsets of the population,
   and wherein the graphical report displayed in place of the graphical report reflecting information relating to the entire population reflects information relating to only the selected named subsets of the population.

* * * * *